(12) United States Patent
Cool et al.

(10) Patent No.: US 8,616,759 B2
(45) Date of Patent: *Dec. 31, 2013

(54) ULTRASONIC TREATMENT SYSTEM

(75) Inventors: Robert Alan Cool, Alpharetta, GA (US);
Thomas David Ehlert, Neenah, WI (US); Patrick Sean McNichols, Hortonville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 752 days.

This patent is subject to a terminal disclaimer.

(21) Appl. No.: 12/438,317

(22) PCT Filed: Sep. 7, 2007

(86) PCT No.: PCT/IB2007/053623
§ 371 (c)(1),
(2), (4) Date: Oct. 28, 2009

(87) PCT Pub. No.: WO2008/029379
PCT Pub. Date: Mar. 13, 2008

(65) Prior Publication Data
US 2010/0067321 A1 Mar. 18, 2010

Related U.S. Application Data

(63) Continuation-in-part of application No. 11/530,311, filed on Sep. 8, 2006, now Pat. No. 7,703,698.

(51) Int. Cl.
*B01F 11/00* (2006.01)

(52) U.S. Cl.
USPC .......................................... 366/118; 366/122

(58) Field of Classification Search
USPC ........................ 366/118, 120, 122, 127, 189
See application file for complete search history.

(56) References Cited

U.S. PATENT DOCUMENTS

| | | | |
|---|---|---|---|
| 2,115,056 A | 4/1938 | Wynn | |
| 2,307,206 A | 1/1943 | Fischer | |
| 2,584,053 A | 1/1952 | Seavey et al. | |
| 2,615,692 A * | 10/1952 | Muller | 366/273 |
| 2,620,894 A | 12/1952 | Peterson et al. | |
| 2,661,192 A | 12/1953 | Horsley et al. | |

(Continued)

FOREIGN PATENT DOCUMENTS

| | | |
|---|---|---|
| CA | 2175065 | 5/1995 |
| CN | 657067 | 8/1986 |

(Continued)

OTHER PUBLICATIONS

Compton R G et al., "Electrode Processes at the Surfaces of Sonotrodes," Electrochimica ACTA, vol. 41, No. 2, pp. 315-320 (Feb. 1, 1996).

(Continued)

*Primary Examiner* — David Sorkin
(74) *Attorney, Agent, or Firm* — Armstrong Teasdale LLP

(57) ABSTRACT

In an ultrasonic treatment system for ultrasonically treating a substance, an elongate ultrasonic horn is positionable within the substance and excitable to vibrate ultrasonically to energize the substance. The horn has a longitudinal axis and an outer surface for contact with the substance. An agitating member of the system is disposed on the ultrasonic horn and is rotatable about the longitudinal axis of the horn during ultrasonic vibration of the horn to agitate the substance.

20 Claims, 13 Drawing Sheets

(56) References Cited

U.S. PATENT DOCUMENTS

| | | |
|---|---|---|
| 2,946,981 A | 7/1960 | O'Neill |
| 3,066,232 A | 11/1962 | Branson |
| 3,160,138 A | 12/1964 | Platzman |
| 3,202,281 A | 8/1965 | Weston |
| 3,239,998 A | 3/1966 | Carter et al. |
| 3,246,881 A | 4/1966 | Davidson et al. |
| 3,249,453 A | 5/1966 | Schnoring et al. |
| 3,273,631 A | 9/1966 | Neuman |
| 3,275,787 A | 9/1966 | Newberry |
| 3,278,165 A | 10/1966 | Gaffney |
| 3,284,991 A | 11/1966 | Ploeger et al. |
| 3,325,348 A | 6/1967 | Bennett |
| 3,326,470 A | 6/1967 | Loudin et al. |
| 3,338,992 A | 8/1967 | Kinney |
| 3,341,394 A | 9/1967 | Kinney |
| 3,425,951 A | 2/1969 | Ishiwata |
| 3,463,321 A | 8/1969 | VanIngen |
| 3,479,873 A | 11/1969 | Hermanns |
| 3,490,584 A | 1/1970 | Balamuth |
| 3,502,763 A | 3/1970 | Hartman |
| 3,519,251 A | 7/1970 | Hammitt et al. |
| 3,542,345 A | 11/1970 | Kuris |
| 3,542,615 A | 11/1970 | Dobo et al. |
| 3,567,185 A | 3/1971 | Ross et al. |
| 3,591,946 A | 7/1971 | Loe |
| 3,664,191 A | 5/1972 | Hermanns |
| 3,692,618 A | 9/1972 | Dorschner et al. |
| 3,782,547 A | 1/1974 | Dietert |
| 3,802,817 A | 4/1974 | Matsuki et al. |
| 3,865,350 A | 2/1975 | Burtis |
| 3,873,071 A | 3/1975 | Tatebe |
| 3,904,392 A | 9/1975 | VanIngen et al. |
| 4,035,151 A | 7/1977 | Czerny et al. |
| 4,062,768 A | 12/1977 | Elliot |
| 4,070,167 A | 1/1978 | Barbee et al. |
| 4,118,797 A | 10/1978 | Tarpley, Jr. |
| 4,122,797 A | 10/1978 | Kawamura et al. |
| 4,168,295 A | 9/1979 | Sawyer |
| 4,218,221 A | 8/1980 | Cottell |
| 4,249,986 A | 2/1981 | Obeda |
| 4,259,021 A | 3/1981 | Goudy, Jr. |
| 4,260,389 A | 4/1981 | Lister |
| 4,266,879 A | 5/1981 | McFall |
| 4,340,563 A | 7/1982 | Appel et al. |
| 4,372,296 A | 2/1983 | Fahim |
| 4,398,925 A | 8/1983 | Trinh et al. |
| 4,425,718 A | 1/1984 | Kawaguchi |
| 4,511,254 A | 4/1985 | North et al. |
| 4,556,467 A | 12/1985 | Kuhn |
| 4,612,016 A | 9/1986 | Jaeger et al. |
| 4,612,018 A | 9/1986 | Tsuboi et al. |
| 4,663,220 A | 5/1987 | Wisneski et al. |
| 4,673,512 A | 6/1987 | Schram |
| 4,693,879 A | 9/1987 | Yoshimura et al. |
| 4,699,636 A | 10/1987 | Bofinger et al. |
| 4,706,509 A | 11/1987 | Riebel |
| 4,708,878 A | 11/1987 | Hagelauer et al. |
| 4,726,522 A | 2/1988 | Kokubo et al. |
| 4,743,361 A | 5/1988 | Schram |
| 4,848,159 A | 7/1989 | Kennedy et al. |
| 4,877,516 A | 10/1989 | Schram |
| 4,879,011 A | 11/1989 | Schram |
| 4,929,279 A | 5/1990 | Hays |
| RE33,524 E | 1/1991 | Schram |
| 4,983,045 A | 1/1991 | Taniguchi |
| 5,006,266 A | 4/1991 | Schram |
| 5,026,167 A | 6/1991 | Berliner, III |
| 5,032,027 A | 7/1991 | Berliner, III |
| 5,059,249 A | 10/1991 | Hays |
| 5,096,532 A | 3/1992 | Neuwirth et al. |
| 5,110,403 A | 5/1992 | Ehlert |
| 5,122,165 A | 6/1992 | Wang et al. |
| 5,164,094 A | 11/1992 | Stuckart |
| 5,169,067 A | 12/1992 | Matsusaka et al. |
| 5,242,557 A | 9/1993 | Jones et al. |
| 5,258,413 A | 11/1993 | Isayev |
| 5,269,297 A | 12/1993 | Weng et al. |
| 5,326,164 A | 7/1994 | Logan |
| 5,330,100 A | 7/1994 | Malinowski |
| 5,335,449 A | 8/1994 | Beatty |
| 5,372,634 A | 12/1994 | Monahan |
| 5,373,212 A | 12/1994 | Beau |
| 5,375,926 A | 12/1994 | Omasa |
| 5,391,000 A | 2/1995 | Taniguchi |
| 5,466,722 A | 11/1995 | Stoffer et al. |
| 5,519,670 A | 5/1996 | Walter |
| 5,536,921 A | 7/1996 | Hedrick et al. |
| 5,583,292 A | 12/1996 | Karbach et al. |
| 5,585,565 A | 12/1996 | Glascock et al. |
| 5,665,383 A | 9/1997 | Grinstaff et al. |
| 5,681,457 A | 10/1997 | Mahoney |
| 5,711,888 A | 1/1998 | Trampler et al. |
| 5,770,124 A | 6/1998 | Marecki et al. |
| 5,803,270 A | 9/1998 | Brodeur |
| 5,810,037 A | 9/1998 | Sasaki et al. |
| 5,831,166 A | 11/1998 | Kozuka et al. |
| 5,853,456 A | 12/1998 | Bryan et al. |
| 5,868,153 A | 2/1999 | Cohen et al. |
| 5,873,968 A | 2/1999 | Pike et al. |
| 5,902,489 A | 5/1999 | Yasuda et al. |
| 5,916,203 A | 6/1999 | Brandon et al. |
| 5,922,355 A | 7/1999 | Parikh et al. |
| 5,935,883 A | 8/1999 | Pike |
| 5,937,906 A | 8/1999 | Kozyuk |
| 5,964,926 A | 10/1999 | Cohen |
| 5,979,664 A | 11/1999 | Brodeur |
| 6,010,592 A | 1/2000 | Jameson et al. |
| 6,020,277 A | 2/2000 | Jameson |
| 6,035,897 A | 3/2000 | Kozyuk |
| 6,053,028 A | 4/2000 | Kraus, Jr. et al. |
| 6,053,424 A | 4/2000 | Gipson et al. |
| 6,055,859 A | 5/2000 | Kozuka et al. |
| 6,060,416 A | 5/2000 | Kobata et al. |
| 6,074,466 A | 6/2000 | Iwasa |
| 6,090,731 A | 7/2000 | Pike et al. |
| 6,106,590 A | 8/2000 | Ueno et al. |
| 6,169,045 B1 | 1/2001 | Pike et al. |
| 6,200,486 B1 | 3/2001 | Chahine et al. |
| 6,218,483 B1 | 4/2001 | Muthiah et al. |
| 6,221,258 B1 | 4/2001 | Feke et al. |
| 6,254,787 B1 | 7/2001 | Kimura et al. |
| 6,266,836 B1 | 7/2001 | Gallego Juarez et al. |
| 6,315,215 B1 | 11/2001 | Gipson et al. |
| 6,322,240 B1 | 11/2001 | Omasa |
| 6,332,541 B1 | 12/2001 | Coakley et al. |
| 6,361,697 B1 | 3/2002 | Coury et al. |
| 6,368,414 B1 | 4/2002 | Johnson |
| 6,380,264 B1 | 4/2002 | Jameson et al. |
| 6,383,301 B1 | 5/2002 | Bell et al. |
| 6,450,417 B1 | 9/2002 | Gipson et al. |
| 6,467,350 B1 | 10/2002 | Kaduchak et al. |
| 6,482,327 B1 | 11/2002 | Mori et al. |
| 6,506,584 B1 | 1/2003 | Chandler et al. |
| 6,547,903 B1 | 4/2003 | McNichols et al. |
| 6,547,935 B2 | 4/2003 | Scott |
| 6,547,951 B1 | 4/2003 | Maekawa |
| 6,551,607 B1 | 4/2003 | Minerath, III et al. |
| 6,576,042 B2 | 6/2003 | Kraus et al. |
| 6,582,611 B1 | 6/2003 | Kerfoot |
| 6,593,436 B2 | 7/2003 | Austin et al. |
| 6,605,252 B2 | 8/2003 | Omasa |
| 6,617,588 B1 | 9/2003 | Sato |
| 6,620,226 B2 | 9/2003 | Hutton et al. |
| 6,624,100 B1 | 9/2003 | Pike et al. |
| 6,627,265 B2 | 9/2003 | Kutilek |
| 6,648,943 B2 | 11/2003 | Possanza et al. |
| 6,655,826 B1 | 12/2003 | Leanos |
| 6,659,365 B2 | 12/2003 | Gipson et al. |
| 6,676,003 B2 | 1/2004 | Ehlert et al. |
| 6,689,730 B2 | 2/2004 | Hortel et al. |
| 6,739,524 B2 | 5/2004 | Taylor-McCune et al. |
| 6,770,600 B1 | 8/2004 | Lamola et al. |
| 6,817,541 B2 | 11/2004 | Sands et al. |
| 6,818,128 B2 | 11/2004 | Minter |

(56) References Cited

U.S. PATENT DOCUMENTS

| | | |
|---|---|---|
| 6,837,445 B1 | 1/2005 | Tsai |
| 6,841,921 B2 | 1/2005 | Stegelmann |
| 6,858,181 B2 | 2/2005 | Aoyagi |
| 6,878,288 B2 | 4/2005 | Scott |
| 6,883,724 B2 | 4/2005 | Adiga et al. |
| 6,889,528 B2 | 5/2005 | Sen et al. |
| 6,890,593 B2 | 5/2005 | Tian |
| 6,897,628 B2 | 5/2005 | Gunnerman |
| 6,902,650 B2 | 6/2005 | Park et al. |
| 6,911,153 B2 | 6/2005 | Minter |
| 6,929,750 B2 | 8/2005 | Laurell et al. |
| 6,935,770 B2 | 8/2005 | Schueler |
| 6,936,151 B1 | 8/2005 | Lock |
| 7,018,546 B2 | 3/2006 | Kurihara et al. |
| 7,083,322 B2 | 8/2006 | Moore et al. |
| 7,083,764 B2 | 8/2006 | Scott |
| 7,090,391 B2 | 8/2006 | Taniguchi |
| 7,108,137 B2 | 9/2006 | Lal et al. |
| 7,150,779 B2 | 12/2006 | Meegan, Jr. |
| 7,156,201 B2 | 1/2007 | Peshkovskiy et al. |
| 7,293,909 B2 | 11/2007 | Taniguchi |
| 7,322,431 B2 | 1/2008 | Ratcliff |
| 7,338,551 B2 | 3/2008 | Kozyuk |
| 7,404,666 B2 | 7/2008 | Tessien |
| 7,414,009 B2 | 8/2008 | Tanaka et al. |
| 7,419,519 B2 | 9/2008 | Li et al. |
| 7,424,883 B2 | 9/2008 | McNichols et al. |
| 7,438,875 B2 | 10/2008 | Do et al. |
| 7,465,426 B2 | 12/2008 | Kerherve et al. |
| 7,504,075 B2 | 3/2009 | Marhasin |
| 7,516,664 B2 | 4/2009 | Meier et al. |
| 7,533,830 B1 | 5/2009 | Rose |
| 7,582,156 B2 | 9/2009 | Tanaka et al. |
| 7,597,277 B2 | 10/2009 | Kawakami et al. |
| 7,673,516 B2 | 3/2010 | Janssen et al. |
| 7,703,698 B2 | 4/2010 | Janssen et al. |
| 7,712,353 B2 | 5/2010 | Janssen et al. |
| 7,735,751 B2 | 6/2010 | Ehlert et al. |
| 7,780,743 B2 | 8/2010 | Greaves et al. |
| 7,785,674 B2 | 8/2010 | Janssen et al. |
| 2001/0040935 A1 | 11/2001 | Case |
| 2002/0036173 A1 | 3/2002 | Feke et al. |
| 2002/0164274 A1 | 11/2002 | Haggett et al. |
| 2003/0042174 A1 | 3/2003 | Austin |
| 2003/0047067 A1 | 3/2003 | Kraus et al. |
| 2003/0048692 A1 | 3/2003 | Cohen et al. |
| 2003/0051989 A1 | 3/2003 | Austin |
| 2003/0061939 A1 | 4/2003 | Hutton et al. |
| 2003/0066899 A1 | 4/2003 | Gipson |
| 2003/0116014 A1 | 6/2003 | Possanza et al. |
| 2003/0143110 A1 | 7/2003 | Kritzler et al. |
| 2003/0194692 A1 | 10/2003 | Purdum |
| 2003/0234173 A1 | 12/2003 | Minter |
| 2004/0022695 A1 | 2/2004 | Simon et al. |
| 2004/0065599 A1 | 4/2004 | Lal et al. |
| 2004/0079580 A1 | 4/2004 | Manna et al. |
| 2004/0120904 A1 | 6/2004 | Lye et al. |
| 2004/0142041 A1 | 7/2004 | MacDonald et al. |
| 2004/0187524 A1 | 9/2004 | Sen et al. |
| 2004/0202728 A1 | 10/2004 | Shanker et al. |
| 2005/0000914 A1 | 1/2005 | Dahlberg et al. |
| 2005/0008560 A1 | 1/2005 | Kataoka et al. |
| 2005/0017599 A1 | 1/2005 | Puskas |
| 2005/0025797 A1 | 2/2005 | Wang |
| 2005/0042129 A1 | 2/2005 | Kazem |
| 2005/0082234 A1 | 4/2005 | Solenthaler |
| 2005/0084438 A1 | 4/2005 | Do et al. |
| 2005/0084464 A1 | 4/2005 | McGrath et al. |
| 2005/0085144 A1 | 4/2005 | MacDonald et al. |
| 2005/0092931 A1 | 5/2005 | Gadgil et al. |
| 2005/0094486 A1* | 5/2005 | Taniguchi ............... 366/171.1 |
| 2005/0129161 A1 | 6/2005 | Laberge |
| 2005/0207431 A1 | 9/2005 | Monai |
| 2005/0208303 A1 | 9/2005 | Atarashi et al. |
| 2005/0220665 A1 | 10/2005 | Ding |
| 2005/0235740 A1 | 10/2005 | Desie et al. |
| 2005/0260106 A1 | 11/2005 | Marhasin |
| 2006/0000034 A1 | 1/2006 | McGrath |
| 2006/0008442 A1 | 1/2006 | MacDonald et al. |
| 2006/0120212 A1 | 6/2006 | Taniguchi et al. |
| 2007/0114306 A1 | 5/2007 | Kawakami et al. |
| 2007/0119785 A1 | 5/2007 | Englehardt et al. |
| 2007/0131034 A1 | 6/2007 | Ehlert et al. |
| 2007/0170277 A1 | 7/2007 | Ehlert et al. |
| 2008/0061000 A1 | 3/2008 | Janssen et al. |
| 2008/0062811 A1 | 3/2008 | Janssen et al. |
| 2008/0063718 A1 | 3/2008 | Janssen et al. |
| 2008/0067418 A1 | 3/2008 | Ross |
| 2008/0069887 A1 | 3/2008 | Baran et al. |
| 2008/0117711 A1 | 5/2008 | Omasa |
| 2008/0155763 A1 | 7/2008 | Janssen et al. |
| 2008/0156737 A1 | 7/2008 | Janssen et al. |
| 2008/0159063 A1 | 7/2008 | Janssen et al. |
| 2008/0192568 A1 | 8/2008 | Hielscher et al. |
| 2008/0251375 A1 | 10/2008 | Hielscher et al. |
| 2009/0014377 A1 | 1/2009 | Janssen et al. |
| 2009/0147905 A1 | 6/2009 | Janssen et al. |
| 2009/0155091 A1 | 6/2009 | Ehlert et al. |
| 2009/0158936 A1 | 6/2009 | Janssen et al. |
| 2009/0162258 A1 | 6/2009 | Janssen et al. |
| 2009/0165654 A1 | 7/2009 | Koenig et al. |
| 2009/0166177 A1 | 7/2009 | Wenzel et al. |
| 2009/0168590 A1 | 7/2009 | Koenig et al. |
| 2009/0168591 A1 | 7/2009 | Wenzel et al. |
| 2009/0262597 A1 | 10/2009 | Kieffer et al. |
| 2010/0150859 A1 | 6/2010 | Do et al. |
| 2010/0206742 A1 | 8/2010 | Janssen et al. |
| 2010/0296975 A1 | 11/2010 | Peshkovsky et al. |

FOREIGN PATENT DOCUMENTS

| | | |
|---|---|---|
| CN | 1535249 A | 10/2004 |
| CN | 1556120 | 12/2004 |
| CN | 1247628 C | 3/2006 |
| CN | 101153138 | 4/2008 |
| DE | 2131878 A1 | 2/1973 |
| DE | 262553 A3 | 12/1988 |
| DE | 9017338 | 3/1991 |
| DE | 4444525 | 6/1996 |
| DE | 19854013 | 5/2000 |
| DE | 19913397 | 9/2000 |
| DE | 19938254 | 2/2001 |
| DE | 10015144 A1 | 10/2001 |
| DE | 29825063 | 6/2004 |
| DE | 202005009923 U1 | 4/2005 |
| DE | 102004040233 | 3/2006 |
| DE | 102005025118 | 1/2007 |
| DE | 102005034629 | 1/2007 |
| EP | 0269941 A1 | 6/1988 |
| EP | 0292470 | 11/1988 |
| EP | 347891 | 12/1989 |
| EP | 0457187 A2 | 11/1991 |
| EP | 0459967 | 12/1991 |
| EP | 625482 | 11/1994 |
| EP | 648531 | 4/1995 |
| EP | 0894612 A2 | 2/1999 |
| EP | 1375432 A1 | 1/2004 |
| EP | 1954388 | 3/2007 |
| EP | 983968 | 3/2008 |
| EP | 2173669 A2 | 4/2010 |
| EP | 2176173 A2 | 4/2010 |
| FR | 2793811 | 11/2000 |
| GB | 1404575 | 9/1975 |
| JP | 56028221 | 3/1981 |
| JP | 57119853 | 7/1982 |
| JP | 5834051 | 2/1983 |
| JP | 62039839 U | 3/1987 |
| JP | 6372364 | 4/1988 |
| JP | 63104664 | 5/1988 |
| JP | 1108081 | 4/1989 |
| JP | 2025602 | 1/1990 |
| JP | 2281185 A | 11/1990 |
| JP | 3053195 A | 3/1991 |
| JP | 3086258 | 4/1991 |

(56) References Cited

FOREIGN PATENT DOCUMENTS

| | | | |
|---|---|---|---|
| JP | 3157129 | A | 7/1991 |
| JP | 6228824 | | 8/1994 |
| JP | 8304388 | | 11/1996 |
| JP | 9286943 | | 11/1997 |
| JP | 10060331 | | 3/1998 |
| JP | 11133661 | | 5/1999 |
| JP | 2000158364 | | 12/1999 |
| JP | 2001017970 | | 1/2001 |
| JP | 2001252588 | | 9/2001 |
| JP | 2003103152 | A | 4/2003 |
| JP | 2004020176 | | 1/2004 |
| JP | 2004256783 | | 9/2004 |
| JP | 2005118688 | | 5/2005 |
| KR | 20020073778 | A | 9/2002 |
| KR | 1020020073778 | A | 9/2002 |
| KR | 1020050013858 | A | 2/2005 |
| KR | 1020050113356 | A | 12/2005 |
| SU | 203582 | A | 1/1967 |
| WO | 2005014489 | A1 | 0/2005 |
| WO | 9400757 | | 1/1994 |
| WO | 9420833 | | 9/1994 |
| WO | 9429873 | A2 | 12/1994 |
| WO | 9600318 | | 1/1996 |
| WO | 9609112 | A1 | 3/1996 |
| WO | 9620017 | A1 | 7/1996 |
| WO | 9743026 | | 11/1997 |
| WO | 9817373 | | 4/1998 |
| WO | 9844058 | | 10/1998 |
| WO | 9933520 | | 7/1999 |
| WO | 0004978 | | 2/2000 |
| WO | 0041794 | | 7/2000 |
| WO | 0139200 | A2 | 5/2001 |
| WO | 0222252 | | 3/2002 |
| WO | 0250511 | | 6/2002 |
| WO | 02080668 | A2 | 10/2002 |
| WO | 03012800 | | 2/2003 |
| WO | 03102737 | | 12/2003 |
| WO | 2004026452 | | 4/2004 |
| WO | 2004064487 | | 8/2004 |
| WO | 2005011804 | | 2/2005 |
| WO | 2006037591 | | 4/2006 |
| WO | 2006043970 | A2 | 4/2006 |
| WO | 2006073645 | A1 | 7/2006 |
| WO | 2006074921 | A1 | 7/2006 |
| WO | 2006093804 | | 9/2006 |
| WO | 2007011520 | A2 | 1/2007 |
| WO | 2007060245 | A1 | 5/2007 |
| WO | 2007095871 | | 8/2007 |
| WO | 2008047259 | | 4/2008 |
| WO | 2008047259 | A1 | 4/2008 |
| WO | 2008085806 | | 7/2008 |

OTHER PUBLICATIONS

Extended European Search Report received in EP Patent Application No. 08789246.9 mailed Nov. 30, 2011.
Non-final Office action regarding U.S. Appl. No. 11/963,237, dated Jul. 8, 2010.
U.S. Appl. No. 11/966,472, filed Dec. 28, 2007.
Non-final Office Action submitted in U.S. Appl. No. 11/530,183, dated Oct. 13, 2010.
Non-final Office Action submitted in U.S. Appl. No. 12/704,058, dated Dec. 9, 2010.
Oct. 27, 2010 Letter regarding the Office Action issued for Mexican Patent Application Serial No. MX/a/2009/002519 mailed Oct. 12, 2010.
Sivakumar et al., "Preparation of naosized TiO2 supported on activated alumina by a sonochemical method: observation of an increased photocatalytic decolourisation efficiency," Research on Chemical Intermediated, 30(7-8): 785-792 (2004).
Supplementary European Search Report issued in EP Application No. 08789242 mailed Dec. 17, 2010.
U.S. Appl. No. 11/966,447, filed Dec. 28, 2007.
Takehi Moriguchi, et al. "Metal-modified silica adsorbents for removal of humic substances in water." Journal of Colloid and Interface Science 283, 2005 300-310, See Abstract, pp. 301 and 304.
U.S. Appl. No. 11/617,497, filed Dec. 28, 2006.
U.S. Appl. No. 11/617,515, filed Dec. 28, 2006.
U.S. Appl. No. 11/950,943, filed Dec. 5, 2007.
U.S. Appl. No. 11/963,139, filed Dec. 21, 2007.
U.S. Appl. No. 11/965,435, filed Dec. 27, 2007.
U.S. Appl. No. 11/966,418, filed Dec. 28, 2007.
"Controlled Thermonuclear Fusion," viewed at http://library.thinkquest.org/17940/texts/fusion_controlled/fusion_controlled.html on Oct. 23, 2007.
"Thermonuclear Fusion Energy Source for Future Generations," viewed at http://www.crppwww.epfl.ch/crppfusion/ on Oct. 23, 2007.
Flannigan, "Measurement of Pressure and Density Inside a Single Sonoluminescing Bubble," Physical Review Letters (May 26, 2006), PRL 96.
International Search Report and Written Opinion regarding PCT/IB2007/052945, dated Feb. 1, 2008.
International Search Report and Written Opinion regarding PCT/IB2007/052947, dated Mar. 12, 2008.
International Search Report and Written Opinion regarding PCT/IB2007/052988, 4 pages, dated Feb. 14, 2008.
International Search Report and Written Opinion regarding PCT/IB2007/053621, dated Feb. 14, 2008.
International Search Report and Written Opinion regarding PCT/IB2007/053623, dated Feb. 14, 2008.
International Search Report and Written Opinion regarding PCT/IB2007/054892, dated May 15, 2008.
International Search Report and Written Opinion regarding PCT/IB2007/054898, dated May 15, 2008.
International Search Report regarding PCT/IB2007/053622, dated Feb. 14, 2008.
Lahey, Taleyarkhan, and Nigmatulin, "Bubble Power," IEEE spectrum, May 2005, pp. 39-43.
Non-final office action regarding U.S. Appl. No. 11/530,311, dated Nov. 5, 2008.
Peplow, Mark, "Desktop fusion is back on the table," viewed at http://nature.com/news/2006/060109/full/060109-5.html on May 4, 2007.
Taleyarkhan, et al., "Additional Evidence of Nuclear Emissions During Acoustic Cavitation," Physcial Review E, (Mar. 2004). vol. 69.
Taleyarkhan, et al., "Evidence for Nuclear Emissions During Acoustic Cavitation," Science, (Mar. 8, 2002), vol. 295, pp. 1868-1873.
Tal-Figiel B., The Formation of Stable W/O, O/W, W/O/W Cosmetic Emulsions in an Ultrasonic Field, viewed at http://www.atypon-link.com/ICHEME/doi/abs/10.1205/cherd06199 on Oct. 19, 2007.
U.S. Appl. No. 11/777,140, filed Jul. 12, 2007.
U.S. Appl. No. 11/530,210, filed Sep. 8, 2006.
U.S. Appl. No. 11/530,311, filed Jan. 26, 2007.
U.S. Appl. No. 11/777,145, filed Jul. 12, 2007.
U.S. Appl. No. 11/777,151, filed Jul. 12, 2007.
U.S. Appl. No. 11/963,237, filed Dec. 21, 2007.
Brenner et al, Single-bubble sonoluminescence, Reviews of Modern Physics, vol. 74, Apr. 2002, pp. 425-484.
D.R.O. Morrison, "Cold Fusion Update No. 9", Jan. 1994, from Newsgroups sci.physics.fusion, http://www.groups.google.com.
J. Lister, Plasma Physics and Controlled Fusion 48, pp. 715-716 (2006).
J.D. Lawson, "Some Criteria for a Power Producing Thermonuclear Reactor", Proc. Phys. Soc. B70, pp. 6-10 (1957).
L.A. Artsimovich, "Controlled Thermonuclear Reactions", Gordon and Breach Science Publishers, New York, first English translation, 1964.
Non-final office action regarding U.S. Appl. No. 11/950,943, dated May 1, 2009.
U.S. Department of Energy, "Report of the Review of Low Energy Nuclear Reactions", Dec. 1, 2004 (USDOE).
Final Office Action Regarding U.S. Appl. No. 11/530,311, dated Jun. 23, 2009.
Non-final office action regarding U.S. Appl. No. 11/617,497, dated Jun. 26, 2009.

(56) References Cited

OTHER PUBLICATIONS

Barbaglia et al., "Search of Fusion Reactions During the Cavitation of a Single Bubble in Deuterated Liquids", Physica Scripta 72, pp. 75-78 (2005).
Blume, T. and Neis, U. "Improved wastewater disinfection by ultrasonic pre-treatment." Ultrasonics Sonochemistry, 2004, No. 11, pp. 333-336.
English translation of Nagel WO 2006/074921 A1, accessed on the EPO website.
European Office Action regarding European Application No. 07805228.9, dated Oct. 9, 2009.
Final Office Action Issued for U.S. Appl. No. 11/530,210 mailed Apr. 19, 2011.
Final Office Action issued for U.S. Appl. No. 11/530,210, mailed Jul. 1, 2011.
Final Office Action issued in related U.S. Appl. No. 11/777,140 on Dec. 1, 2010.
Final Office Action issued in U.S. Appl. No. 11/530,183, dated Mar. 22, 2011.
Final Office Action issued in U.S. Appl. No. 11/966,418, mailed Jan. 12, 2011.
Final Office Action issued in U.S. Appl. No. 11/966,447, mailed Jan. 5, 2011.
Final Office Action issued in U.S. Appl. No. 11/966,458, dated Mar. 17, 2011.
Final Office Action issued in U.S. Appl. No. 12/335,231 dated Mar. 31, 2011.
Final Office Action Regarding U.S. Appl. No. 11/965,435, dated Mar. 11, 2010.
First Office Action for China Patent Application No. 200780033331. 3, dated Nov. 14, 2011.
First Office Action for China Patent Application No. 200880121407. 2, dated Aug. 24, 2011.
First Office Action for China Patent Application No. 20088016947.3, dated Jun. 24, 2011.
First Office Action for Russian Patent Application No. 2009112526, dated Jun. 24, 2011.
International Search Report and Written Opinion Issued for PCT/IB2008/052760, dated Feb. 17, 2009.
International Search Report and Written Opinion Issued for PCT/IB2008/052764, dated Apr. 2, 2009.
International Search Report and Written Opinion Issued for PCT/IB2008/052766, dated Mar. 31, 2009.
International Search Report and Written Opinion Issued for PCT/IB2008/055051, dated Feb. 20, 2009.
International Search Report and Written Opinion Issued for PCT/IB2008/055394, dated Sep. 28, 2009.
International Search Report and Written Opinion Issued for PCT/IB2008/055395, dated Sep. 14, 2009.
International Search Report and Written Opinion Issued for PCT/IB2008/055514, dated Aug. 25, 2009.
International Search Report and Written Opinion Issued for PCT/IB2008/055517, dated Aug. 18, 2009.
International Search Report and Written Opinion issued for PCT/IB2008/055518, dated Aug. 18, 2009.
International Search Report and Written Opinion Issued for PCT/IB2008/055520, dated Aug. 18, 2009.
International Search Report and Written Opinion regarding PCT/IB2008/055396, dated Jul. 29, 2009.
International Search Report and Written Opinion regarding PCT/IB2009/055090, dated Jul. 16, 2010.
International Search Report and Written Opinion regarding PCT/IB2009/055092, dated Jul. 16, 2010.
Kuo et al., "Nao-particles dispersion effect on Ni/Al2O3 Composite Coatings," Materials Chemistry and Physics, 86: 5-10 (2004).
Non-final Office action regarding U.S. Appl. No. 11/530,183, dated Apr. 19, 2010.
Moriguchi et al, "Metal-modified silica adsorbents for removal of humic substances in water", Journal of Colloidal and Interface Science 283 (2005) 300-310.
Non-Final Office Action issued for U.S. Appl. No. 11/963,139, mailed Jun. 15, 2011.
Non-Final Office Action issued for U.S. Appl. No. 12/335,176, mailed Jul. 13, 2011.
Non-Final Office Action issued for U.S. Appl. No. 12/335,231, mailed Jul. 13, 2011.
Non-final Office Action issued in related U.S. Appl. No. 11/530,210 on Dec. 1, 2010.
Non-final Office Action issued in related U.S. Appl. No. 11/530,210 on Jun. 28, 2010.
Non-final Office action issued in related U.S. Appl. No. 11/777,140 on Aug. 9, 2010.
Non-final Office action issued in related U.S. Appl. No. 11/966,418 on Aug. 2, 2010.
Non-final Office action issued in related U.S. Appl. No. 11/966,447 on Aug. 2, 2010.
Non-final Office Action issued in U.S. Appl. No. 11/777,140, dated Feb. 23, 2011.
Non-final Office Action issued in U.S. Appl. No. 11/963,139, dated Feb. 18, 2011.
Non-final Office Action issued in U.S. Appl. No. 11/966,472, dated Mar. 31, 2011.
Non-final Office Action received in U.S. Appl. No. 11/966,458, mailed Sep. 28, 2010.
Non-final office action regarding U.S. Appl. No. 11/617,515, dated Mar. 27, 2009.
Non-final Office Action regarding U.S. Appl. No. 11/777,151, dated Dec. 8, 2010.
Non-final Office Action regarding U.S. Appl. No. 11/966,418, dated Jan. 12, 2011.
Extended European Search Report received in EP Patent Application No. 08868425 dated Feb. 14, 2012.
Chinese First Office Action for Patent Application Serial No. 200880123165.0 dated Oct. 10, 2012; 9 pages.
EP Office Action for Patent Application No. 08 789 246.9-2104 dated Sep. 4, 2012; 4 pages.
EP Office Action for Patent Application No. 08 789 248.5-2104 dated Sep. 4, 2012; 4 pages.
Chinese First Office Action for Patent Application No. 200880123172.0 dated Oct. 10, 2012; 9 pages.
Chinese First Office Action for Patent Application No. 200880123174.X dated Sep. 20, 2012; 8 pages.
Chinese Office Action for Patent Application No. 200880123174.X dated Mar. 27, 2013; 5 pages.
European Search Report regarding European Application No. 08789248.5, dated May 2, 2013; 3 pages.
Extended European Search Report for EP Patent Application No. 08867871.9, dated Sep. 10, 2012.
Non-final Office action issued for U.S. Appl. No. 12/335,176 (Jun. 6, 2013).

\* cited by examiner

ULTRASONIC TREATMENT SYSTEM

CROSS-REFERENCE TO RELATED APPLICATIONS

This application is a U.S. National Stage patent application of International Application Serial Number PCT/IB2007/053623, filed on Sep. 7, 2007, which is a continuation-in-part application of U.S. patent application Ser. No. 11/530,311, filed on Sep. 8, 2006 now issued as U.S. Pat. No. 7,703,698.

FIELD OF INVENTION

This invention relates generally to systems for ultrasonically treating a substance, and more particularly to an ultrasonic treatment system for ultrasonically agitating a substance.

BACKGROUND

The agitation of liquid solutions finds numerous applications for enhancing the treatment of a liquid such as single component liquid, liquid-liquid mixing, liquid-gas mixing and liquid-particulate material mixing. For example, in formulating inks, paints and other viscous materials two or more components (at least one being a liquid) are mixed together to form the applicable solution. Other examples include the simultaneous introduction of various liquids and gases into the chamber to promote certain reactions. This would include the flow of water into the chamber with the introduction of gases such as air and/or oxygen and/or ozone only to mention a few. Also this chamber can be used to induce a variety of chemical reactions such as the decomposition of hydrogen peroxide, emulsion polymerization reactions and the creation of emulsions for emulsion polymerization mechanisms.

In other applications, this system can be used for the deagglomeration of particles in a liquid stream. This would include the deagglomeration of nano-particles such as pigments used in the formulation of inks. Plus the simultaneous formulation of an ink using these nano-pigment particles. This system can also have the simultaneous exposure to UltraViolet (UV) light to promote certain reactions of fluids or fluid/gas or fluid/gas/solids systems in the ultrasonic chamber. Another application could be in the medical field where this mixing system is used in the preparation of pharmaceutical formulations that are composed of powders/liquids and liquids for dispensing for use.

In particular, such agitation treatments lend themselves to continuous type flow treatment systems in which the liquid is treated while continuously moving through the system, usually through a column or elongate chamber. By agitating the liquid, the desired reaction (e.g., mixing or other result) may be expedited and thus capable of being achieved in a continuous flow operation.

Agitation of a liquid may be referred to as static agitation, in which agitation is caused by the particular flow parameters (e.g., flow rate, pressure, etc.) of the one or more liquid components through a column. Static agitation may also occur by directing a flow of liquid past stationary agitating members, such as a helical vane-type construction or other structures disposed in the flow column or chamber that disrupt and thus turbulate the flow of the liquid to be treated. Dynamic agitation is brought about by moving, e.g., rotating, oscillating, vibrating, etc. one or more agitating members (e.g., vanes, fan blades, etc.) within the treatment chamber through which the liquid flows.

One particularly useful type of dynamic agitation of the liquid results from ultrasonic cavitation, a more rigorous agitation, in the liquid. Ultrasonic cavitation refers to the formation, growth and implosive collapse of bubbles in liquid due ultrasonic energization thereof. Such cavitation results from pre-existing weak points in the liquid, such as gas-filled crevices in suspended particulate matter or transient microbubbles from prior cavitation events. As ultrasound passes through a liquid, the expansion cycles exert negative pressure on the liquid, pulling the molecules away from one another. Where the ultrasonic energy is sufficiently intense, the expansion cycle creates cavities in the liquid when the negative pressure exceeds the local tensile strength of the liquid, which varies according to the type and purity of liquid.

Small gas bubbles formed by the initial cavities grow upon further absorption of the ultrasonic energy. Under the proper conditions, these bubbles undergo a violent collapse, generating very high pressures and temperatures. In some fields, such as what is known as sonochemistry, chemical reactions take advantage of these high pressures and temperatures brought on by cavitation. However, the growth and violent collapse of the bubbles themselves provides a desirably rigorous agitation of the liquid. Cavitation that occurs at the interface between the ultrasonically energized liquid and a solid surface is rather asymmetric and generates high speed jets of liquid, further agitating the liquid. This type of cavitation is particularly useful, for example, in facilitating a more complete mixing together of two or more components of a liquid solution.

Another example of an application wherein substances are agitated includes the mixing of solutions that have separated or partially separated into different components making up the liquid solution. The separation can be two or more liquids separating into different phases wherein the more dense liquid(s) will settle below the less dense liquid(s). The separation can also be were a particulate material settles below the liquid. It is common that the separated/partially separated liquid solution has to be remixed before it can be used.

In yet another example, some substances set up over time. That is, they solidify, partially solidify, or turn gelatinous. Often these substances have to be made ready to flow (e.g., less viscous) before they can be used. Typically, these substances are warmed using an external heater wherein a heating source is placed on the outside of the container holding the substance. The heat source is then activated to heat the container and thereby the substance. The substance, once heated, is rendered more ready to flow. However, this type of heating process can be relatively slow and inefficient.

SUMMARY

In one aspect, an ultrasonic treatment system for ultrasonically treating a substance generally comprises an elongate ultrasonic horn positionable within the substance and excitable to vibrate ultrasonically to energize the substance. The horn has a longitudinal axis and an outer surface for contact with the substance. The system further comprises an agitating member disposed on the ultrasonic horn and rotatable about the longitudinal axis of the horn during ultrasonic vibration of the horn to agitate the substance.

In anther aspect, a method of ultrasonically treating a substance disposed within a container generally comprises positioning an ultrasonic horn within the container with at least a portion of the horn submerged in the substance. The horn is ultrasonically excited to thereby ultrasonically energize the substance. An agitating member is rotated within the substance while the ultrasonic horn is excited to agitate the substance as the substance is ultrasonically energized.

BRIEF DESCRIPTION OF THE DRAWINGS

Corresponding reference characters indicate corresponding parts throughout the drawings.

DETAILED DESCRIPTION

Figure 1:
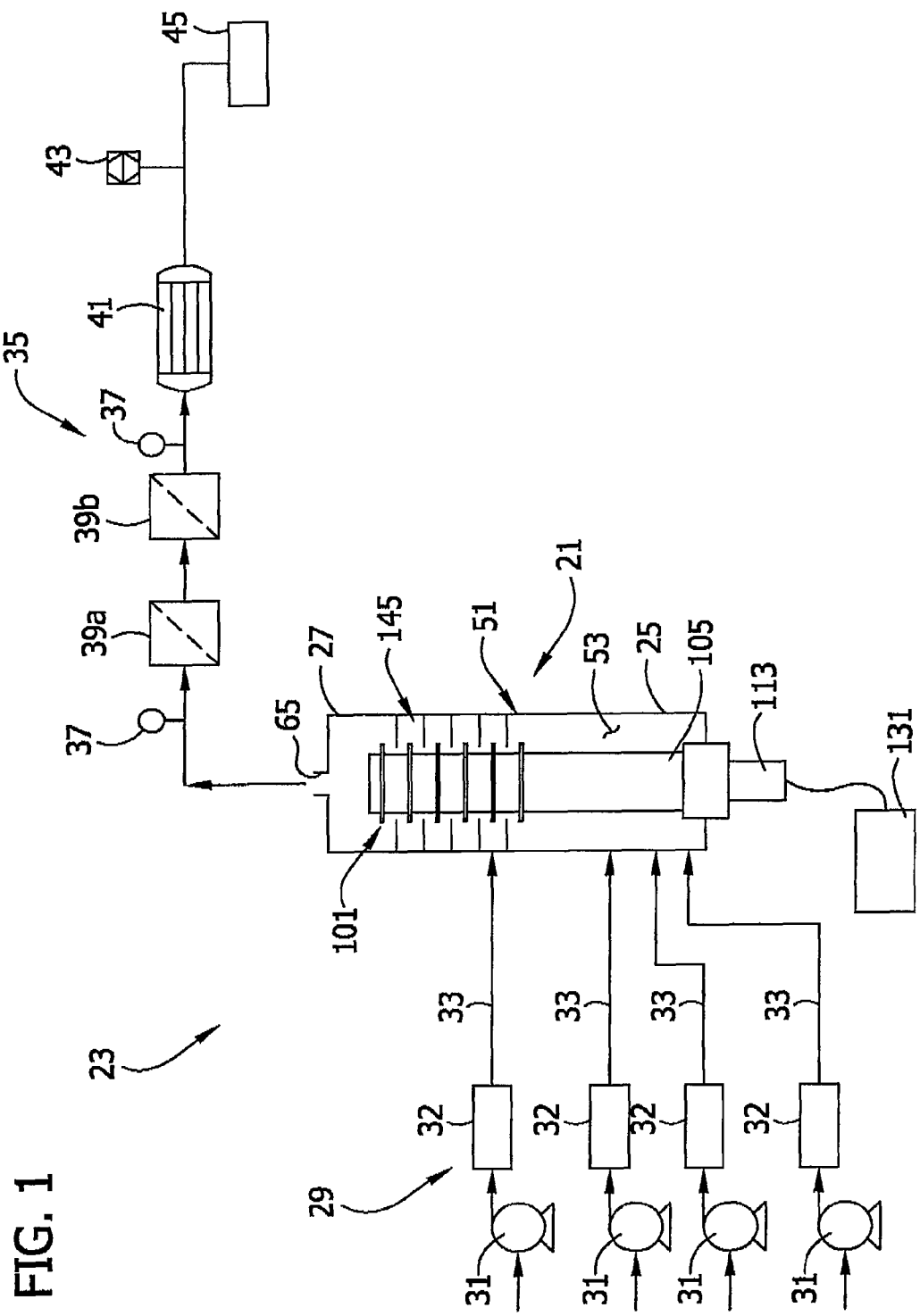
FIG. 1 is a schematic of a mixing system according to one embodiment of a system for ultrasonically treating a liquid illustrated in the form of an ink solution mixing system and incorporating an ultrasonic treatment chamber for ultrasonically treating a liquid.

With particular reference now to FIG. 1, in one embodiment a system for ultrasonically treating a liquid generally comprises an ultrasonic treatment chamber, generally indicated at 21, that is operable to ultrasonically treat a liquid. The term "liquid" as used herein is intended to refer to a single component liquid, a solution comprised of two or more components in which at least one of the components is a liquid such as a liquid-liquid mixture, a liquid-gas mixture or a liquid in which particulate matter is entrained, or other viscous fluids.

The ultrasonic treatment chamber 21 is illustrated schematically in FIG. 1 and further described herein with reference to use of the treatment chamber in a mixing system, generally indicated at 23, used to form a liquid solution by mixing together two or more components in which at least one of the components is a liquid by applying ultrasonic energy to the solution within the chamber, and more particularly to such a mixing system for forming a liquid ink solution from two or more ink components. It is understood, however, that the ultrasonic treatment chamber 21 illustrated and described herein may be used with mixing systems for forming liquid solutions other than liquid ink solutions. It is also understood that the ultrasonic treatment chamber 21 may be used in liquid ultrasonic treatment systems other than for mixing but where ultrasonic agitation of the liquid at least in part comprises the desired treatment of the liquid.

In particular, the ultrasonic treatment chamber 21 is suitable for use in liquid treatment systems in which ultrasonic agitation of the liquid is desired in an in-line, e.g., continuous flow process in which fluid flows continuously through the chamber. Examples of other contemplated uses of the ultrasonic treatment chamber include, without limitation, mixing solutions, paints and other viscous materials (e.g., other than ink solutions); food processing and treatment; degassing solutions (e.g., pulling dissolved gasses from liquid solutions such as oxygen, nitrogen, ammonia, etc.); and enhancing chemical reactions, for example, as is common in sonochemistry where excitation is imparted to a chemical reaction to expedite the reaction. It is contemplated, though, that the treatment chamber 21 may be used in a liquid treatment system in which liquid is treated in accordance with a batch process instead of a continuous flow process and remain with the scope of this invention.

Additional examples of contemplated mixing uses for the ultrasonic treatment chamber 21 include, without limitation, mixing resins and curing agents for the plastic industry; mixing pulp slurries with chemical additives such as bleaching agents, wet strength agents, starches, dyes, enzymes, fillers, anti-slime agents, silicone additives, etc.; mixing compounds used in the paper and tissue industries, such as clay slurries for coatings, polymeric additives such as wet strength resins, starch suspensions, silicone compounds, lotions, filler suspensions, etc.; mixing resins and coloring agents, fillers, and other compounds; mixing immiscible phases to prepare emulsions, such as food emulsions (e.g., for sun block products, hand lotions, lipstick compounds, etc.), cosmetics, cleaning agents (including nanoemulsions of oil and water), pharmaceutical compounds, etc; and mixing coloring agents and other compounds to form cosmetics such as hair dyes.

Other contemplated uses of the ultrasonic treatment chamber 21 include, without limitation, degassing a mixture to simplify subsequent treatment and reduce void formation; deinking recycled papermaking fibers, in which ultrasonic energy may assist in removal of inks (particularly in the presence of enzymes, detergents, or other chemicals); hydrogenating oils, cheese, or other food stuffs, in which gas and slurries or liquids must be mixed; homogenizing milk and other compounds; incorporating into bioreactors and fermentation units, in which delicate cells must be mixed with nutrients and other compounds without intense mechanical shear that might damage cells; treating wastewater and/or manure, in which a variety of additives and air bubbles may need to be mixed with a slurry; manufacturing petrochemicals such as lubricant mixtures, gasoline blends, wax mixtures, etc., and compounds derived from petrochemicals; processing dough (e.g., mixing combinations of agents to be added to flour or processing the dough itself, which may result in improved breakdown of gluten, etc.). The ultrasonic treatment chamber 21 may also be used in chemical reactors involving single or multiple phases, including slurries.

In other contemplated uses, the ultrasonic treatment chamber 21 may be used to remove entrapped gas bubbles from coating solutions that are used in gravure coating, meyer rod coating or any other coating applications where it is desirable to remove air bubbles from a solution.

In the illustrated embodiment of FIG. 1, the ultrasonic treatment chamber 21 is generally elongate and has a general inlet end 25 (a lower end in the orientation of the illustrated embodiment) and a general outlet end 27 (an upper end in the orientation of the illustrated embodiment). The system 23 is configured such that fluid enters the treatment chamber 21 generally at the inlet end 25 thereof, flows generally longitudinally within the chamber (e.g., upward in the orientation of illustrated embodiment) and exits the chamber generally at the outlet end of the chamber.

The terms "upper" and "lower" are used herein in accordance with the vertical orientation of the ultrasonic treatment chamber 21 illustrated in the various drawings and are not intended to describe a necessary orientation of the chamber in use. That is, while the chamber 21 is most suitably oriented vertically, with the outlet end 27 of the chamber above the inlet end 25 as illustrated in the various drawings, it is understood that the chamber may be oriented with the inlet end above the outlet end, or it may be oriented other than in a vertical orientation and remain within the scope of this invention.

The terms axial and longitudinal refer directionally herein to the lengthwise direction of the chamber 21 (e.g., end-to-end such as the vertical direction in the illustrated embodiments). The terms transverse, lateral and radial refer herein to a direction normal to the axial (e.g., longitudinal) direction. The terms inner and outer are also used in reference to a direction transverse to the axial direction of the ultrasonic treatment chamber 21, with the term inner referring to a direction toward the interior of the chamber (e.g., toward the longitudinal axis of the chamber) and the term outer referring to a direction toward the exterior of the chamber (e.g., away from the longitudinal axis of the chamber).

The inlet end 25 of the ultrasonic treatment chamber 21 is in fluid communication with a suitable delivery system, generally indicated at 29, that is operable to direct one or more liquid components to, and more suitably through, the chamber 21. For example, in the illustrated liquid ink solution mixing system 23 of FIG. 1 the delivery system 29 comprises a plurality of pumps 31 (such as one pump for each ink component to be mixed together) operable to pump the respective components from a corresponding source (illustrated schematically in FIG. 1 as reference number 32 thereof) to the inlet end 25 of the chamber 21 via suitable conduits (illustrated schematically in FIG. 1 as reference number 33). As an example, four such pumps 31, component sources and corresponding conduits 33 are shown in FIG. 1 for delivering a combination of ink components including, for example components used for forming a pigmented ink solution such as, without limitation, a pigment dispersion, water, glycerin, a binder, a surfactant and/or a biocide, or components for forming a reactive ink solution such as, without limitation, a dye or lake, water, glycerin, a surfactant, a biocide and a binder, or components for forming other liquid ink solutions.

It is understood that the delivery system 29 may be configured to deliver less than four (including one), or more than four components to the treatment chamber 21 without departing from the scope of this invention. It is also contemplated that delivery systems other than that illustrated in FIG. 1 and described herein may be used to deliver one or more components to the inlet end 25 of the ultrasonic treatment chamber 21 without departing from the scope of this invention.

The ink mixing system 23 of the illustrated embodiment also comprises a post-processing system, generally indicated at 35, in fluid communication with the outlet end 27 of the ultrasonic treatment chamber 21 for processing liquid solution (e.g., the ink solution) after the liquid solution exits the chamber. The illustrated mixing system 23 comprises one or more pressure gauges 37 (two are illustrated in FIG. 1) to monitor the liquid pressure in the mixing system. One or more filter units 39a, 39b may also be disposed along the flow path of the liquid solution downstream of the treatment chamber 21 to filter out particulate material, such as dirt, debris or other contaminates that may be present in the liquid solution (e.g., from initially being present in one or more of the components delivered to the chamber) from the liquid solution. For example, in the illustrated embodiment a first filter unit 39a is constructed to filter out particles sized greater than about 0.5 microns and a second filter unit 39b downstream from the first filter unit is constructed to further filter out particles sized greater than about 0.2 microns. It is understood, however, that only one, or more than two filter units 39a, 39b may be used, or that the filter units may be omitted altogether, without departing from the scope of this invention.

Still referring to FIG. 1, the post-processing system 35 may further comprise a degassing and bubble removal unit 41 that is operable to remove gas bubbles from the liquid solution (e.g., the ink solution) after the ultrasonic treatment in the treatment chamber 21. In one particularly suitable embodiment the degassing and bubble removal unit 41 comprises a conventional membrane contactor. The construction and operation of membrane contactors is well known to those skilled in the art and is therefore not described in further detail herein. One example of a suitable membrane contactor is that available from Membrana of Charlotte, N.C., U.S.A. under the trade name SuperPhobic. One or more sensor units 43 may also be provided to monitor various characteristics of the liquid solution (e.g., the ink solution) such as, without limitation, pH, conductivity, viscosity, temperature, color, surface tension and other characteristics.

Following post-processing, the liquid treated by the ultrasonic treatment chamber 21 may be directed to a storage container or operating device (either of which is indicated schematically by the single reference number 45) having any of a number of applications. For example, the liquid ink solution mixing system 23 of FIG. 1 may deliver ink solution directly into an ink-jet head for continuous delivery of ink solution onto substrates, or pumped directly into a coater, such as a slot die, gravure, silk screen, meyer rod, roller, spray or other suitable coater for use in coating substrates with ink solution. Examples of other applications include, without limitation, the delivery of the treated liquid to a spray nozzle for atomization, or the delivery of the treated liquid to an injection molding or a reactive injection molding. Any system (not shown) used to deliver the treated liquid to an applicator may be disposed downstream of the post-processing system (such as post-processing system 35), or the post-processing system may be omitted and a system (not shown) may communicate directly with the outlet port 65 of the chamber 21 to deliver the treated liquid to a subsequent applicator.

Figure 2:
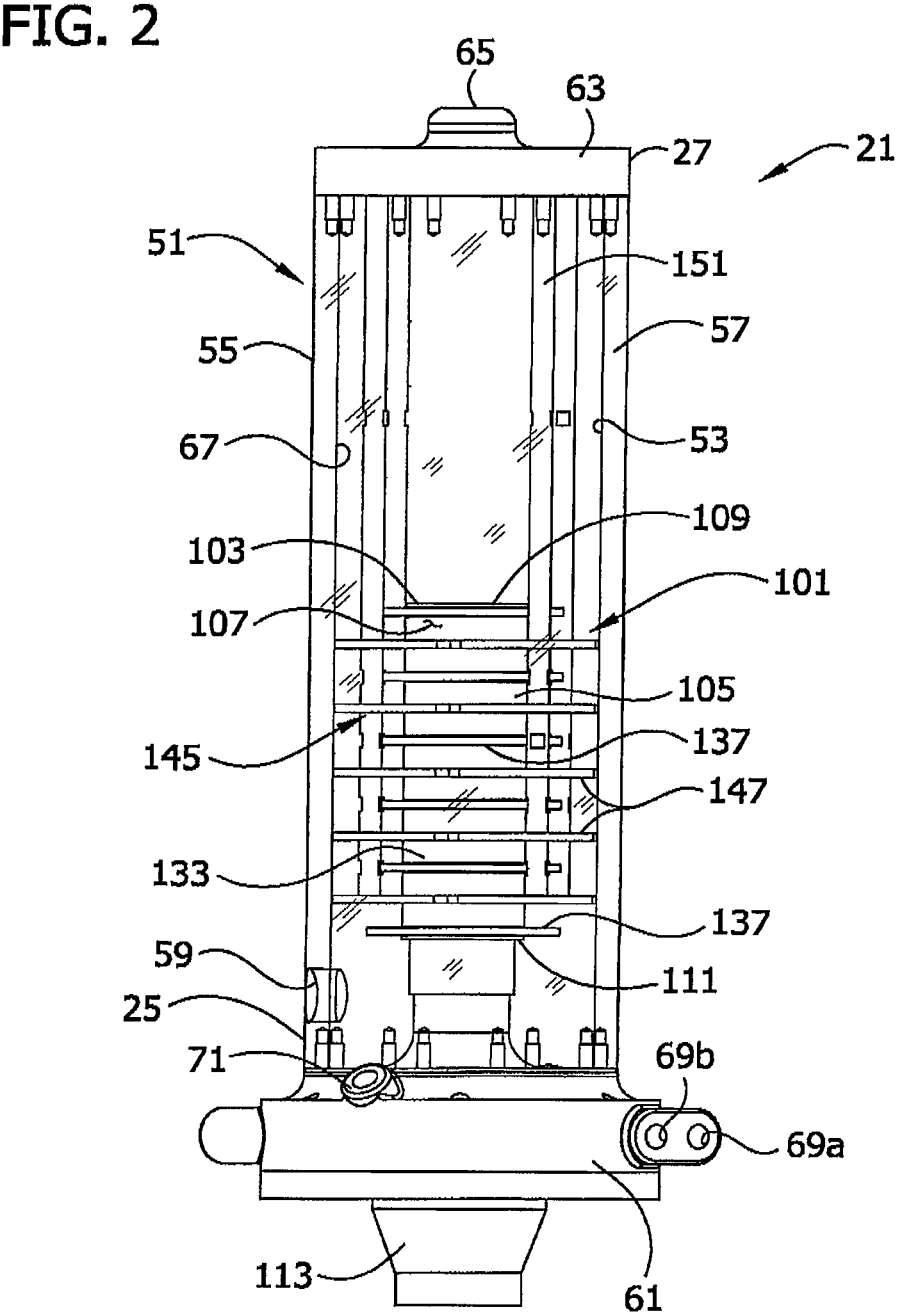
FIG. 2 is a side elevation of an ultrasonic treatment chamber for ultrasonically treating a liquid.

With reference now to FIG. 2, the ultrasonic treatment chamber 21 of the liquid treatment system 23 comprises a housing 51 defining an interior space 53 of the chamber through which liquid delivered to the chamber flows from the inlet end 25 to the outlet end 27 thereof. The housing 51 suitably comprises an elongate tube 55 generally defining, at least in part, a sidewall 57 of the chamber 21. The tube 55 may have one or more inlet ports (one such inlet port being illustrated in FIG. 2 and indicated at 59) formed therein through which one or more components to be treated within the chamber 21 are delivered to the interior space 53 thereof. In the illustrated embodiment, the housing 51 further comprises an inlet collar 61 that is connected to and mounted on one end of the tube 55 to further define (along with the inlet port 59) the inlet end 25 of the chamber 21.

The housing 51 also comprises a closure 63 connected to and substantially closing the longitudinally opposite end of the sidewall 57, and having at least one outlet port 65 therein to generally define the outlet end 27 of the treatment chamber 21. The sidewall 57 (e.g., defined by the elongate tube 55) of the chamber 21 has an inner surface 67 that together with the collar 61 and the closure 63 define the interior space 53 of the chamber. In the illustrated embodiment, the tube 55 is generally cylindrical so that the chamber sidewall 57 is generally annular in cross-section. However, it is contemplated that the cross-section of the chamber sidewall 57 may be other than annular, such as polygonal or another suitable shape, and remain within the scope of this invention. The chamber sidewall 57 of the illustrated chamber 21 is suitably constructed of a transparent material, although it is understood that any suitable material may be used as long as the material is compatible with the liquid components being treated in the chamber, the pressure at which the chamber is intended to operate, and other environmental conditions within the chamber such as temperature.

Figure 3:
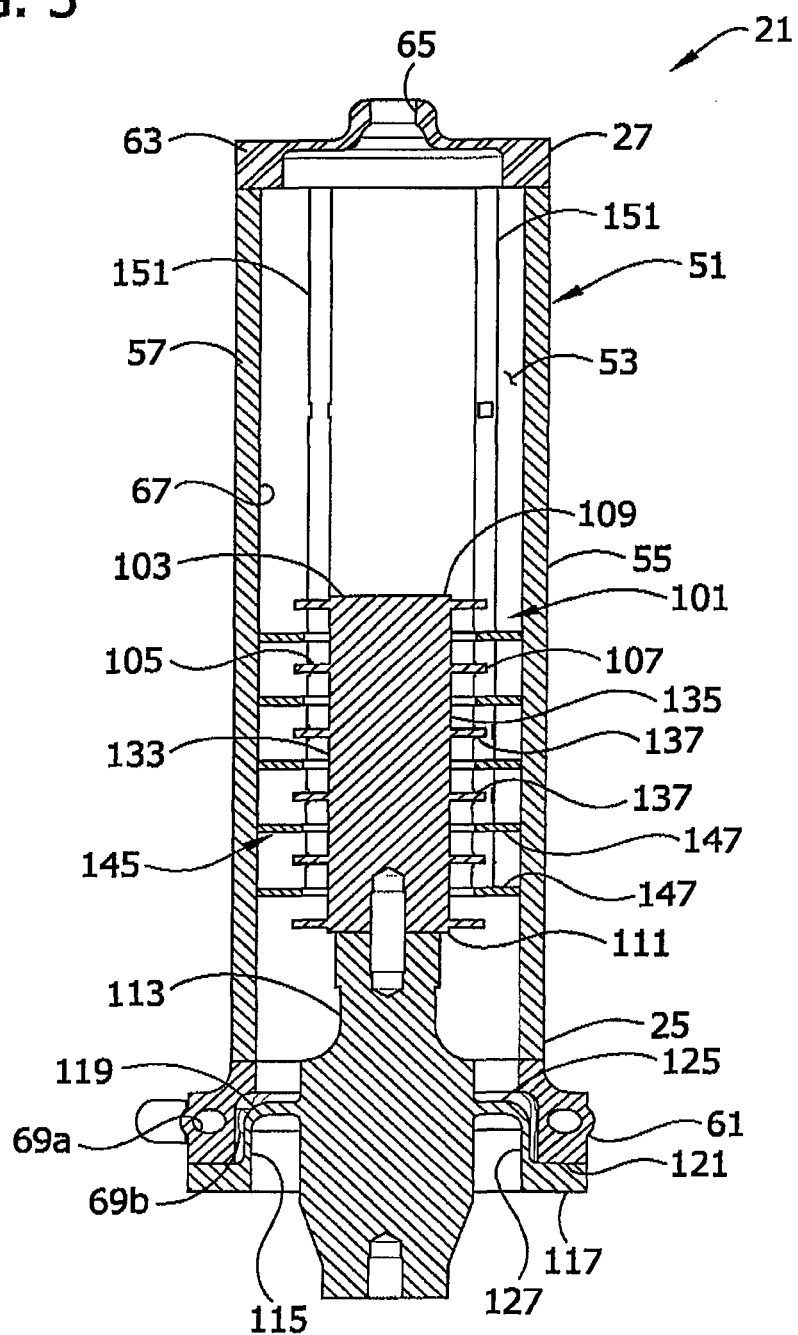
FIG. 3 is a longitudinal (e.g., vertical) cross-section of the ultrasonic treatment chamber of FIG. 2.
Figure 3A:
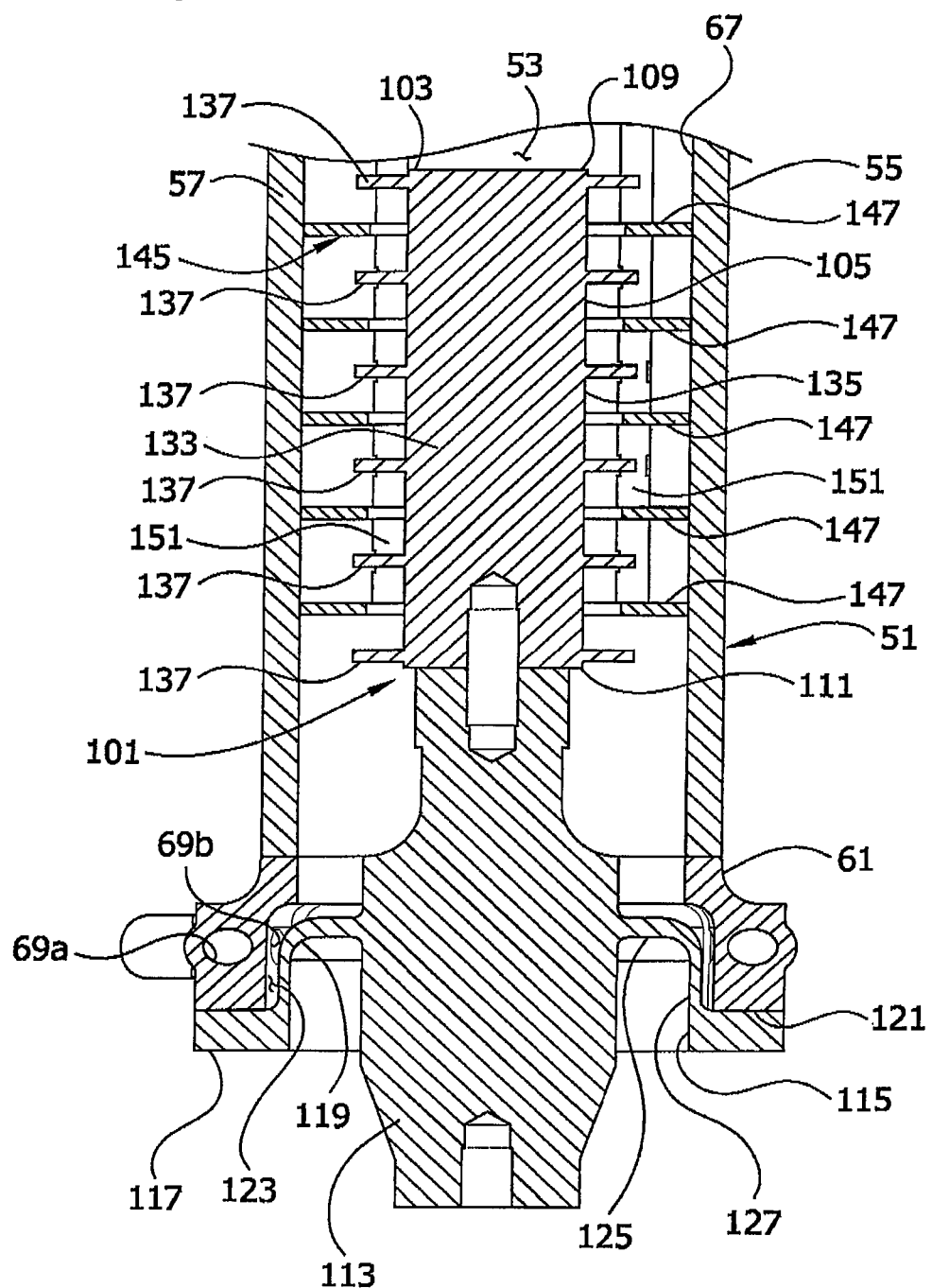
FIG. 3A is an enlarged, fragmented view of a portion of the cross-section of FIG. 3.
Figure 3B:
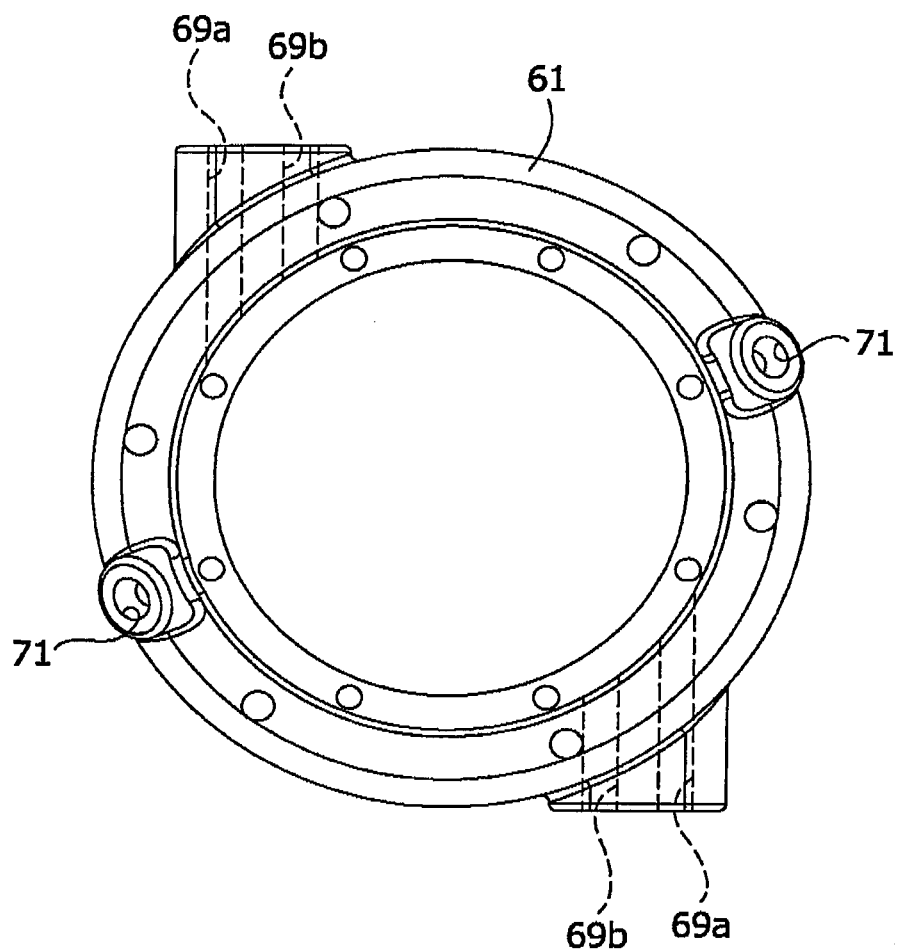
FIG. 3B is a top plan view of a collar that forms part of the housing of the ultrasonic treatment chamber of FIG. 2.

With particular reference to FIG. 3B, the inlet collar 61 at the inlet end 25 of the chamber 21 is generally annular and has at least one, and more suitably a plurality of inlet ports 69a, 69b formed therein for receiving liquid solution components into the interior space 53 of the chamber 21. At least one inlet port 69a is oriented generally tangentially relative to the annular collar 61 so that liquid flows into the interior space 53 of the chamber 21 generally tangentially thereto to impart a swirling action to liquid as it enters the chamber. More suitably, in the illustrated embodiment a pair of inlet ports 69a, 69b are arranged in parallel alignment with each and extend generally tangentially relative to the annular collar 61, with one port 69a being designated herein as the outer inlet port and the other port 69b being designated the inner inlet port.

This dual tangential inlet port 69a, 69b arrangement is particularly useful for initiating mixing of two or more components together before the liquid solution is further subjected to ultrasonic treatment within the chamber 21. In a particularly suitable use of this arrangement, where the liquid to be treated in the chamber 21 comprises two or more liquids, the liquid having the lowest viscosity is directed to flow into the chamber via the outer inlet port 69a while the liquid having the highest viscosity is directed to flow into the chamber via the inner inlet port 69b. The flow of the lower viscosity ingredient through the outer inlet port 69a has a tendency to draw the higher viscosity ingredient into the interior space 53 of the chamber 21 to speed the rate at which the higher viscosity ingredient is introduced into the chamber.

This action, combined with the swirling action resulting from the tangential direction in which the liquid components are directed into the chamber 21, facilitate an initial mixing of these two components before the liquid solution flows further through the chamber for ultrasonic treatment. If additional components are to be added to the mixture, such components may be delivered into the interior space 53 of the chamber 21 via the inlet port 59 formed in the chamber sidewall 57. In the illustrated embodiment, the collar 61 also has an additional tangential set of inlet ports and a pair of generally vertically oriented inlet ports 71. It is understood, however, that none of the ports 69a, 69b need to be oriented tangentially relative to the collar 61 to remain within the scope of this invention. It is also contemplated that the collar 61 may be omitted altogether such that all components to be mixed together are delivered to the inlet port 59 formed in the chamber sidewall 57.

An ultrasonic waveguide assembly, generally indicated at 101, extends longitudinally at least in part within the interior space 53 of the chamber 21 to ultrasonically energize liquid (and any other components of the liquid solution) flowing through the interior space 53 of the chamber. In particular, the ultrasonic waveguide assembly 101 of the illustrated embodiment extends longitudinally from the lower or inlet end 25 of the chamber 21 up into the interior space 53 thereof to a terminal end 103 of the waveguide assembly disposed intermediate the uppermost inlet port (e.g., inlet port 59 where it is present, or otherwise inlet ports 69a, 69b). More suitably, the waveguide assembly 101 is mounted, either directly or indirectly, to the chamber housing 51 as will be described later herein.

The ultrasonic waveguide assembly 101 suitably comprises an elongate horn assembly, generally indicated at 105, disposed entirely with the interior space 53 of the housing 51 intermediate the uppermost inlet port and the outlet port for complete submersion within the liquid being treated within the chamber 21, and more suitably it is aligned coaxially with the chamber sidewall 57. The horn assembly 105 has an outer surface 107 that together with the inner surface 67 of the sidewall 57 defines a flow path within the interior space 53 of the chamber 21 along which liquid and other components flow past the horn assembly within the chamber (this portion of the flow path being broadly referred to herein as the ultrasonic treatment zone). The horn assembly 105 has an upper end 109 defining a terminal end of the horn assembly (and therefore the terminal end 103 of the waveguide assembly) and a longitudinally opposite lower end 111. The waveguide assembly 101 of the illustrated embodiment also comprises a booster 113 coaxially aligned with and connected at an upper end thereof to the lower end 111 of the horn assembly 105. It is understood, however, that the waveguide assembly 101 may comprise only the horn assembly 105 and remain within the scope of this invention. It is also contemplated that the booster 113 may be disposed entirely exterior of the chamber housing 51, with the horn assembly 105 mounted on the chamber housing 51 without departing from the scope of this invention.

The ultrasonic waveguide assembly 101, and more particularly the booster 113 in the illustrated embodiment of FIG. 3, is suitably mounted on the chamber housing 51, e.g., on the tube 55 defining the chamber sidewall 57, at the upper end thereof by a mounting member 115 that is configured to vibrationally isolate the waveguide assembly (which vibrates ultrasonically during operation thereof) from the ultrasonic treatment chamber housing. That is, the mounting member 115 inhibits the transfer of longitudinal and transverse mechanical vibration of the waveguide assembly 101 to the chamber housing 51 while maintaining the desired transverse position of the waveguide assembly (and in particular the horn assembly 105) within the interior space 53 of the chamber housing and allowing both longitudinal and transverse displacement of the horn assembly within the chamber housing. In the illustrated embodiment, the mounting member 115 also at least in part (e.g., along with the booster 113) closes the inlet end 25 of the chamber 21.

As one example, the mounting member 115 of the illustrated embodiment generally comprises an annular outer segment 117 extending transverse to the waveguide assembly 101 in transversely spaced relationship therewith, and a flange member 119 interconnecting the outer segment to the waveguide assembly. While the flange member 119 and transverse outer segment 117 of the mounting member 115 extend continuously about the circumference of the waveguide assembly 101, it is understood that one or more of these elements may be discontinuous about the waveguide assembly such as in the manner of wheel spokes, without departing from the scope of this invention. The outer segment 117 of the mounting member 115 is particularly configured to seat down against a shoulder 121 formed by the inlet collar 61.

Figure 6:
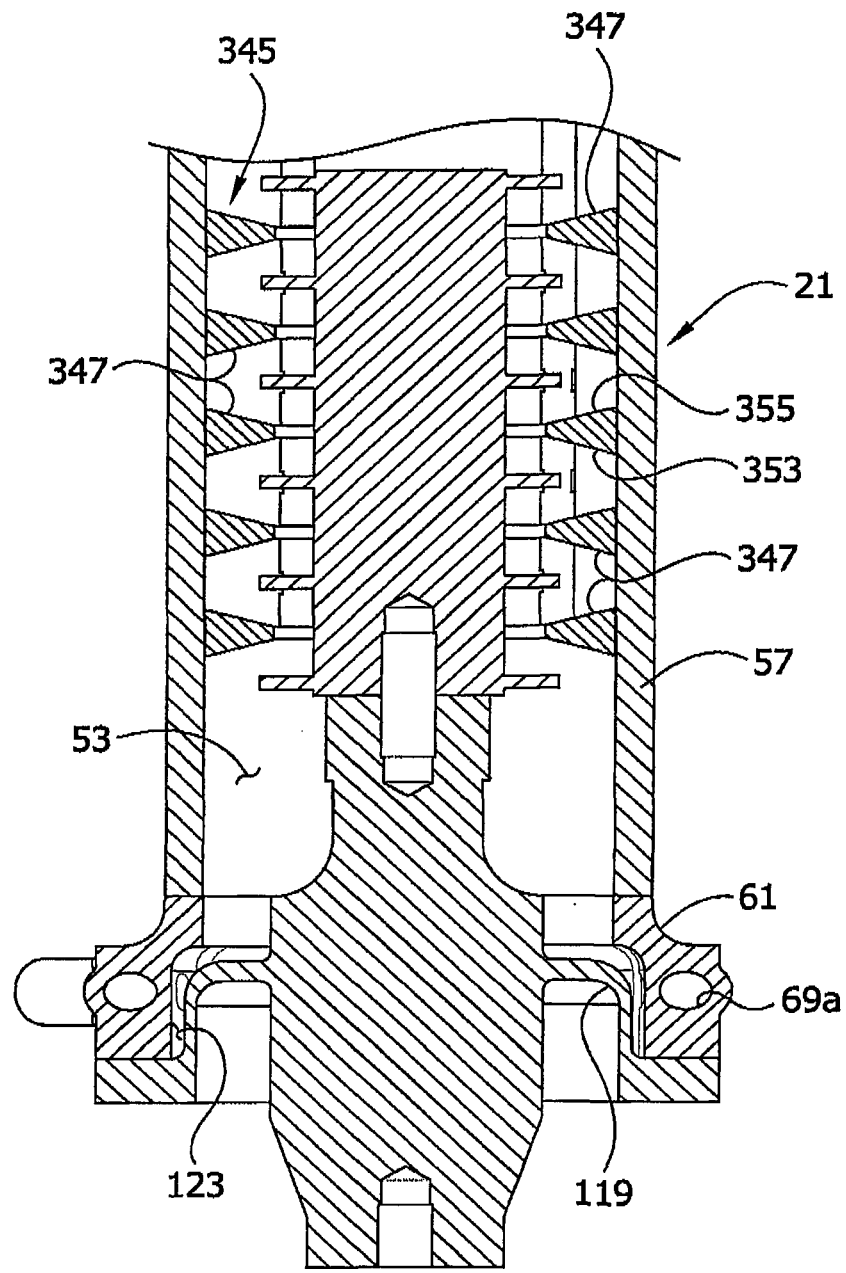
FIG. 6 is a fragmented and enlarged longitudinal cross-section similar to that of FIG. 3A but illustrating an alternative embodiment of a baffle assembly.

As seen best in FIG. 6, the internal cross-sectional dimension (e.g., internal diameter) of the collar 61 is stepped outward as the collar extends longitudinally downward away from the chamber sidewall 57 to accommodate the flange member 119. In one particularly suitable embodiment, the collar 61 is sufficiently sized to be transversely spaced from the flange member 119 to define a generally annular gap 123 therebetween in which liquid delivered to the chamber 21 via the inlet ports 69a, 69b of the collar enters the interior space 53 of the chamber. This annular gap 123 further facilitates the swirling action of the liquid upon entry into the chamber 21 via the collar inlet ports 69a, 69b.

The mounting member 115 is suitably sized in transverse cross-section so that at least an outer edge margin of the outer segment 117, and more suitably a substantial transverse portion of the outer segment is seated on the shoulder 121 formed on the collar 61. A suitable fastening system (not shown), such as a plurality of bolts and corresponding nuts (not shown), secures the outer segment 117 of the mounting member 115 to the shoulder 121 formed by the collar 61 to thereby connect the booster 113 (and more broadly the waveguide assembly 101) to the chamber housing 51.

The flange member 119 may suitably be constructed relatively thinner than the outer segment 117 of the mounting member 115 to facilitate flexing and/or bending of the flange member 119 in response to ultrasonic vibration of the waveguide assembly 101. As an example, in one embodiment the thickness of the flange member 119 may be in the range of about 0.2 mm to about 5 mm, and more suitably about 2.5 mm. The flange member 119 of the illustrated mounting member 115 suitably has an inner transverse component 125 connected to the waveguide assembly 101 and extending generally transversely outward therefrom but inward of the outer segment 117 of the mounting member, and an axial, or longitudinal component 127 interconnecting the transverse inner component with the outer segment of the mounting member and together with the transverse inner component generally forming a generally L-shaped cross-section of the flange member 119. It is contemplated, however, that the flange member 119 may instead have a generally U-shaped cross-section or other suitable cross-sectional shape such as an H-shape, an I-shape, an inverted U-shape and the like and remain within the scope of this invention. Additional examples of suitable mounting member 115 configurations are illustrated and described in U.S. Pat. No. 6,676,003, the entire disclosure of which is incorporated herein by reference to the extent it is consistent herewith.

The longitudinal component 127 of the illustrated flange member 119 is suitably cantilevered to the transverse outer segment 117 and to the transverse inner component 125 of the flange member, while the inner component of the flange member is cantilevered to the waveguide assembly 101. Accordingly, the flange member 119 is capable of dynamically bending and/or flexing relative to the outer segment 117 of the mounting member 115 in response to vibratory displacement of the waveguide assembly 101 to thereby isolate the chamber housing 51 from transverse and longitudinal displacement of the waveguide assembly.

While in the illustrated embodiment the transverse outer segment 117 of the mounting member 115 and the transverse inner component 125 of the flange member 119 are disposed generally at longitudinally offset locations relative to each other, it is understood that they may be disposed at generally the same location (e.g., where the flange member is generally U-shaped in cross-section) or at locations other than those illustrated in FIG. 3) without departing from the scope of this invention.

In one particularly suitable embodiment the mounting member 115 is of single piece construction. Even more suitably the mounting member 115 may be formed integrally with the booster 113 (and more broadly with the waveguide assembly 101) as illustrated in FIG. 3. However, it is understood that the mounting member 115 may be constructed separate from the waveguide assembly 101 and remain within the scope of this invention. It is also understood that one or more components of the mounting member 115 may be separately constructed and suitably connected or otherwise assembled together.

In one suitable embodiment the mounting member 115 is further constructed to be generally rigid (e.g., resistant to static displacement under load) so as to hold the waveguide assembly 101 in proper alignment within the interior space 53 of the chamber 21. For example, the rigid mounting member 115 in one embodiment may be constructed of a non-elastomeric material, more suitably metal, and even more suitably the same metal from which the booster 113 (and more broadly the waveguide assembly 101) is constructed. The term rigid is not, however, intended to mean that the mounting member 115 is incapable of dynamic flexing and/or bending in response to ultrasonic vibration of the waveguide assembly 101. In other embodiments, the rigid mounting member 115 may be constructed of an elastomeric material that is sufficiently resistant to static displacement under load but is otherwise capable of dynamic flexing and/or bending in response to ultrasonic vibration of the waveguide assembly 101. While the mounting member 115 illustrated in FIG. 3 is constructed of a metal, and more suitably constructed of the same material as the booster 113, it is contemplated that the mounting member may be constructed of other suitable generally rigid materials without departing from the scope of this invention.

A suitable ultrasonic drive system 131 (shown schematically in FIG. 1) including at least an exciter (not shown) and a power source (not shown) is disposed exterior of the chamber 21 and operatively connected to the booster 113 (and more broadly to the waveguide assembly 101) to energize the waveguide assembly to mechanically vibrate ultrasonically. Examples of suitable ultrasonic drive systems 131 include a Model 20A3000 system available from Dukane Ultrasonics of St. Charles, Ill., and a Model 2000CS system available from Herrmann Ultrasonics of Schaumberg, Ill.

In one embodiment, the drive system 131 is capable of operating the waveguide assembly 101 at a frequency in the range of about 15 kHz to about 100 kHz, more suitably in the range of about 15 kHz to about 60 kHz, and even more suitably in the range of about 20 kHz to about 40 kHz. Such ultrasonic drive systems 131 are well known to those skilled in the art and need not be further described herein.

With particular reference to FIG. 3, the horn assembly 105 comprises an elongate, generally cylindrical horn 133 having an outer surface 135, and two or more (i.e., a plurality of) agitating members 137 connected to the horn and extending at least in part transversely outward from the outer surface of the horn in longitudinally spaced relationship with each other. The horn 133 is suitably sized to have a length equal to about one-half of the resonating wavelength (otherwise commonly referred to as one-half wavelength) of the horn. In one particular embodiment, the horn 133 is suitably configured to resonate in the ultrasonic frequency ranges recited previously, and most suitably at 20 kHz. For example, the horn 133 may be suitably constructed of a titanium alloy (e.g., Ti6Al4V) and sized to resonate at 20 kHz. The one-half wavelength horn 133 operating at such frequencies thus has a length (corresponding to a one-half wavelength) in the range of about 4 inches to about 6 inches, more suitably in the range of about 4.5 inches to about 5.5 inches, even more suitably in the range of about 5.0 inches to about 5.5 inches, and most suitably a length of about 5.25 inches (133.4 mm). It is understood, however, that the ultrasonic treatment chamber 21 may include a horn assembly 105 in which the horn 133 is sized to have any increment of one-half wavelength without departing from the scope of this invention.

In the illustrated embodiment, the agitating members 137 comprise a series of six washer-shaped rings that extend continuously about the circumference of the horn member 133 in longitudinally spaced relationship with each other and transversely (e.g., radially in the illustrated embodiment) outward from the outer surface of the horn. In this manner the vibrational displacement of each of the agitating members 137 relative to the horn 133 is relatively uniform about the circumference of the horn. It is understood, however, that the agitating members 137 need not each be continuous about the circumference of the horn 133. For example, the agitating members 137 may instead be in the form of spokes, blades, fins or other discrete structural members that extend transversely outward from the outer surface 135 of the horn 133.

To provide a dimensional example, for the horn 133 of the illustrated embodiment of FIG. 3 having a length of about 5.25 inches (133.4 mm), one of the rings 137 is suitably disposed adjacent the terminal end of the horn 133 (and hence of the waveguide assembly 101), and more suitably is longitudinally spaced approximately 0.063 inches (1.6 mm) from the terminal end of the horn member. In other embodiments the uppermost ring 137 may be disposed at the terminal end of the horn and remain within the scope of this invention. The rings 137 are each about 0.125 inches (3.2 mm) in thickness and are longitudinally spaced from each other (between facing surfaces of the rings) a distance of about 0.875 inches (22.2 mm).

It is understood that the number of agitating members 137 (e.g., the rings in the illustrated embodiment) may be less than or more than six without departing from the scope of this invention. It is also understood that the longitudinal spacing between the agitating members 137 may be other than as illustrated in FIG. 3 and described above (e.g., either closer or spaced further apart). While the rings 137 illustrated in FIG. 3 are equally longitudinally spaced from each other, it is alternatively contemplated that where more than two agitating members are present the spacing between longitudinally consecutive agitating members need not be uniform to remain within the scope of this invention.

In particular, the locations of the agitating members 137 are at least in part a function of the intended vibratory displacement of the agitating members upon vibration of the horn 133. For example, in the illustrated embodiment the horn 133 has a nodal region located generally longitudinally centrally of the horn (e.g., between the third and fourth rings). As used herein, the "nodal region" of the horn 133 refers to a longitudinal region or segment of the horn member along which little (or no) longitudinal displacement occurs during ultrasonic vibration of the horn and transverse (e.g., radial in the illustrated embodiment) displacement of the horn is generally maximized. Transverse displacement of the horn 133 suitably comprises transverse expansion of the horn but may also include transverse movement (e.g., bending) of the horn.

In the illustrated embodiment, the configuration of the one-half wavelength horn 133 is such that the nodal region is particularly defined by a nodal plane (i.e., a plane transverse to the horn member at which no longitudinal displacement occurs while transverse displacement is generally maximized) is present. This plane is also sometimes referred to as a nodal point. Accordingly, agitating members 137 (e.g., in the illustrated embodiment, the rings) that are disposed longitudinally further from the nodal region of the horn 133 will experience primarily longitudinal displacement while agitating members that are longitudinally nearer to the nodal region will experience an increased amount of transverse displacement and a decreased amount of longitudinal displacement relative to the longitudinally distal agitating members.

It is understood that the horn 133 may be configured so that the nodal region is other than centrally located longitudinally on the horn member without departing from the scope of this invention. It is also understood that one or more of the agitating members 137 may be longitudinally located on the horn so as to experience both longitudinal and transverse displacement relative to the horn upon ultrasonic vibration of the horn assembly 105.

Still referring to FIG. 3, the agitating members 137 are sufficiently constructed (e.g., in material and/or dimension such as thickness and transverse length, which is the distance that the agitating member extends transversely outward from the outer surface 135 of the horn 133) to facilitate dynamic motion, and in particular dynamic flexing/bending of the agitating members in response to the ultrasonic vibration of the horn member. In one particularly suitable embodiment, for a given ultrasonically frequency at which the waveguide assembly 101 is to be operated in the ultrasonic chamber (otherwise referred to herein as the predetermined frequency of the waveguide assembly) and a particular liquid to be treated within the chamber 21, the agitating members 137 and horn 133 are suitably constructed and arranged to operate the agitating members in what is referred to herein as an ultrasonic cavitation mode at the predetermined frequency.

As used herein, the ultrasonic cavitation mode of the agitating members refers to the vibrational displacement of the agitating members sufficient to result in cavitation (i.e., the formation, growth, and implosive collapse of bubbles in a liquid) of the liquid being treated at the predetermined ultrasonic frequency. For example, where the liquid flowing within the chamber comprises an aqueous solution, and more particularly water, and the ultrasonic frequency at which the waveguide assembly 101 is to be operated (i.e., the predetermined frequency) is about 20 kHZ, one or more of the agitating members 137 are suitably constructed to provide a vibrational displacement of at least 1.75 mils (i.e., 0.00175 inches, or 0.044 mm) to establish a cavitation mode of the agitating members. It is understood that the waveguide assembly 101 may be configured differently (e.g., in material, size, etc.) to achieve a desired cavitation mode associated with the particular liquid being treated. For example, as the viscosity of the liquid being treated changes, the cavitation mode of the agitating members may need to be changed.

In particularly suitable embodiments, the cavitation mode of the agitating members corresponds to a resonant mode of the agitating members whereby vibrational displacement of the agitating members is amplified relative to the displacement of the horn. However, it is understood that cavitation may occur without the agitating members operating in their resonant mode, or even at a vibrational displacement that is greater than the displacement of the horn, without departing from the scope of this invention.

In one suitable dimensional example, a ratio of the transverse length of at least one and more suitably all of the agitating members 137 to the thickness of the agitating member is in the range of about 2:1 to about 6:1. As another example, the rings 137 illustrated in FIG. 3 each extend transversely outward from the outer surface 135 of the horn 133 a length of about 0.5 inches (12.7 mm) and the thickness of each ring is about 0.125 inches (3.2 mm), so that the ratio of transverse length to thickness of each ring is about 4:1. It is understood, however that the thickness and/or the transverse length of the agitating members 137 may be other than that of the rings illustrated in FIG. 3 without departing from the scope of this invention. Also, while the agitating members 137 (rings) of the illustrated embodiment each have the same transverse length and thickness, it is understood that the agitating members may have different thicknesses and/or transverse lengths.

In the illustrated embodiment, the transverse length of the agitating member 137 also at least in part defines the size (and at least in part the direction) of the flow path along which liquid or other flowable components in the interior space 53 of the chamber 21 flows past the horn assembly 105. For example, the horn 133 illustrated in FIG. 3 has a radius of about 0.875 inches (22.2 mm) and the transverse length of each ring 137 is, as discussed above, about 0.5 inches (12.7 mm). The radius of the inner surface 67 of the housing sidewall 57 is approximately 1.75 inches (44.5 mm) so that the transverse spacing between each ring and the inner surface of the housing sidewall is about 0.375 inches (9.5 mm). It is contemplated that the spacing between the horn outer surface 135 and the inner surface 67 of the chamber sidewall 57 and/or between the agitating members 137 and the inner surface of the chamber sidewall may be greater or less than described above without departing from the scope of this invention.

In general, the horn 133 may be constructed of a metal having suitable acoustical and mechanical properties. Examples of suitable metals for construction of the horn 133 include, without limitation, aluminum, monel, titanium, stainless steel, and some alloy steels. It is also contemplated that all or part of the horn 133 may be coated with another metal such as silver, platinum and copper to mention a few. In one particularly suitable embodiment, the agitating members 137 are constructed of the same material as the horn 133, and are more suitably formed integrally with the horn. In other embodiments, one or more of the agitating members 137 may instead be formed separate from the horn 133 and connected thereto to form the horn assembly 105.

While the agitating members 137 (e.g., the rings) illustrated in FIG. 3 are relatively flat, i.e., relatively rectangular in cross-section, it is understood that the rings may have a cross-section that is other than rectangular without departing from the scope of this invention. The term cross-section is used in this instance to refer to a cross-section taken along one transverse direction (e.g., radially in the illustrated embodiment) relative to the horn outer surface 135). Additionally, although the agitating members 137 (e.g., the rings) illustrated in FIG. 3 are constructed only to have a transverse component, it is contemplated that one or more of the agitating members may have at least one longitudinal (e.g., axial) component to take advantage of transverse vibrational displacement of the horn (e.g., at and near the nodal region of the horn illustrated in FIG. 3) during ultrasonic vibration of the waveguide assembly 101.

Figure 5:
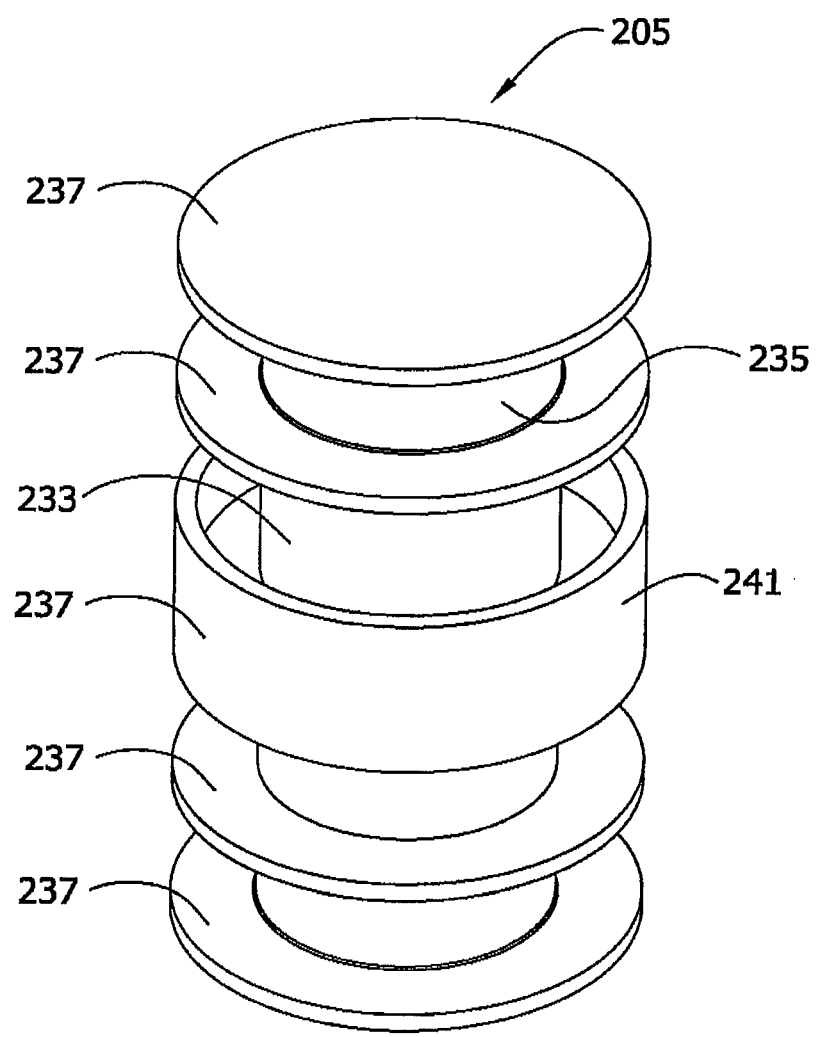
FIG. 5 is a front perspective of an alternative embodiment of a horn assembly.

For example, FIG. 5 illustrates one alternative embodiment of a horn assembly 205 having five agitating members 237 extending transversely outward from the outer surface 235 of the horn 233. While each of the agitating members 237 has a transverse component, e.g., in the form of a ring similar to those of FIG. 3, the centermost agitating member 237 also has an annular longitudinal component 241 secured to the transverse component. In particular, the centermost agitating member 237 is disposed longitudinally generally at the nodal region, and more particularly at the nodal plane of the horn 233 in the illustrated embodiment of FIG. 5, where the transverse displacement of the horn 233 is generally maximized during ultrasonic energization thereof while longitudinal displacement is generally minimized. The longitudinal component 241 is thus capable of dynamic motion (e.g., flexing/bending) in a transverse direction in response to transverse displacement of the horn 233 upon ultrasonic energization of the horn.

It is contemplated that the longitudinal component 241 need not extend entirely longitudinal, i.e., parallel to the outer surface of the horn 233, as long as the longitudinal component has some longitudinal vector to it. Also, while in the illustrated embodiment the agitating member 237 having the longitudinal component 241 is generally T-shaped in cross-section, it is understood that other configurations of such an agitating member are suitable, such as an L-shaped cross-section (with the longitudinal component extending either up or down), a plus-shaped cross-section, or other suitable cross-section. It is also contemplated that one or more holes may formed in the centermost agitating member 237, such as in the transverse component and/or the longitudinal components 241 to allow fluid to flow freely in both the horizontal and vertical direction through this member.

As best illustrated in FIG. 3, the terminal end 103 of the waveguide assembly 101 (e.g., of the horn 133 in the illustrated embodiment) is substantially spaced longitudinally from the outlet port 65 at the outlet end 27 of the chamber 21 to provide what is referred to herein as a buffer zone (i.e., the portion of the interior space 53 of the chamber housing 51 longitudinally beyond the terminal end 103 of the waveguide assembly 101) to allow a more uniform mixing of components as the liquid flows downstream of the terminal end 103 of the waveguide assembly 101 to the outlet end 27 of the chamber. For example, in one suitable embodiment the buffer zone has a void volume (i.e, the volume of that portion of the open space 53 within the chamber housing 51 within the buffer zone) in which the ratio of this buffer zone void volume to the void volume of the remainder of the chamber housing interior space upstream of the terminal end of the waveguide assembly is suitably in the range of about 0.01:1 to about 5.0:1, and more suitably about 1:1.

Providing the illustrated buffer zone is particularly suitable where the chamber 21 is used for mixing components together to form a liquid solution such as in the ink solution mixing system 23 of FIG. 1. That is, the longitudinal spacing between the terminal end 103 of the waveguide assembly 101 and the outlet port 65 of the chamber 21 provides sufficient space for the agitated flow of the mixed liquid solution to generally settle prior to the liquid solution exiting the chamber via the outlet port. This is particularly useful where, as in the illustrated embodiment, one of the agitating members 137 is disposed at or adjacent the terminal end of the horn 133. While such an arrangement leads to beneficial back-mixing of the liquid as it flows past the terminal end of the horn 133, it is desirable that this agitated flow settle out at least in part before exiting the chamber. It is understood, however, that the terminal end 103 of the waveguide assembly 101 within the interior space 53 of the chamber 21 may be disposed longitudinally nearer to the outlet port 65 at the outlet end 27 of the chamber, or that the buffer zone may even be substantially entirely omitted, without departing from the scope of this invention.

The opposite, e.g., more proximal end of the horn assembly 105 is suitably spaced longitudinally from the collar 61 to define what is referred to herein as a liquid intake zone in which initial swirling of liquid within the interior space 53 of the chamber housing 51 occurs upstream of the horn assembly 105. This intake zone is particularly useful where the treatment chamber 21 is used for mixing two or more components together whereby initial mixing is facilitated by the swirling action in the intake zone as the components to be mixed enter the chamber housing 51. It is understood, though, that the proximal end of the horn assembly 105 may be nearer to the collar 61 than is illustrated in FIG. 3, and may be substantially adjacent to the collar so as to generally omit the intake zone, without departing from the scope of this invention.

Still referring to FIG. 3, a baffle assembly, generally indicated at 145 is disposed within the interior space 53 of the chamber 21, and in particular generally transversely adjacent the inner surface 67 of the sidewall 57 and in generally transversely opposed relationship with the horn assembly 105. In one suitable embodiment, the baffle assembly 145 comprises one or more baffle members 147 disposed adjacent the inner surface 67 of the housing sidewall 57 and extending at least in part transversely inward from the inner surface of the sidewall toward the horn assembly 105. More suitably, the one or more baffle members 147 extend transversely inward from the housing sidewall inner surface 67 to a position longitudinally intersticed with the agitating members 137 that extend outward from the outer surface 135 of the horn member 133. The term "longitudinally intersticed" is used herein to mean that a longitudinal line drawn parallel to the longitudinal axis of the horn 133 passes through both the agitating members 137 and the baffle members 147. As one example, in the illustrated embodiment the baffle assembly 145 comprises five, generally annular baffle members 147 (i.e., extending continuously about the horn 133) longitudinally intersticed with the six rings 137 of the horn assembly 105.

As a more particular example, the five annular baffle members 147 illustrated in FIG. 3 are of the same thickness as the horn assembly rings 137 (i.e., 0.125 inches (3.2 mm)) and are spaced longitudinally from each other (e.g., between opposed faces of consecutive baffle members) equal to the longitudinal spacing between the rings (i.e., 0.875 inches (22.2 mm)). Each of the annular baffle members 147 has a transverse length (e.g., inward of the inner surface 67 of the housing sidewall 57) of about 0.5 inches (12.7 mm) so that the innermost edges of the baffle members extend transversely inward beyond the outermost edges of the agitating members 137 (e.g., the rings). It is understood, however, that the baffle members 147 need not extend transversely inward beyond the outermost edges of the agitating members 137 of the horn assembly 105 to remain within the scope of this invention.

It will be appreciated that the baffle members 147 thus extend into the flow path of liquid that flows within the interior space 53 of the chamber 21 past the horn assembly 105 (e.g., within the ultrasonic treatment zone). As such, the baffle members 147 inhibit liquid against flowing along the inner surface 67 of the chamber sidewall 57 past the horn assembly 105, and more suitably the baffle members facilitate the flow of liquid transversely inward toward the horn assembly for flowing over the agitating members of the horn assembly to thereby facilitate ultrasonic energization (i.e., agitation) of the liquid.

To inhibit gas bubbles against stagnating or otherwise building up along the inner surface 67 of the sidewall 57 and across the face on the underside of each baffle member 147, e.g., as a result of agitation of the liquid, a series of notches 149 (broadly openings) are formed in the outer edge of each of the baffle members to facilitate the flow of gas (e.g., gas bubbles) between the outer edges of the baffle members and the inner surface of the chamber sidewall. For example, in the illustrated embodiment four such notches are formed in the outer edge of each of the baffle members 147 in equally spaced relationship with each other. It is understood that openings may be formed in the baffle members 147 other than at the outer edges where the baffle members abut the housing, and remain within the scope of this invention. It is also understood, further, that these notches 149 may instead be omitted.

It is further contemplated that the baffle members 147 need not be annular or otherwise extend continuously about the horn 133. For example, the baffle members 147 may extend discontinuously about the horn 133, such as in the form of spokes, bumps, segments or other discrete structural formations that extend transversely inward from adjacent the inner surface 67 of the housing sidewall 57. The term "continuously" in reference to the baffle members 147 extending continuously about the horn does not exclude a baffle members as being two or more arcuate segments arranged in end-to-end abutting relationship, i.e., as long as no significant gap is formed between such segments.

Figure 4:
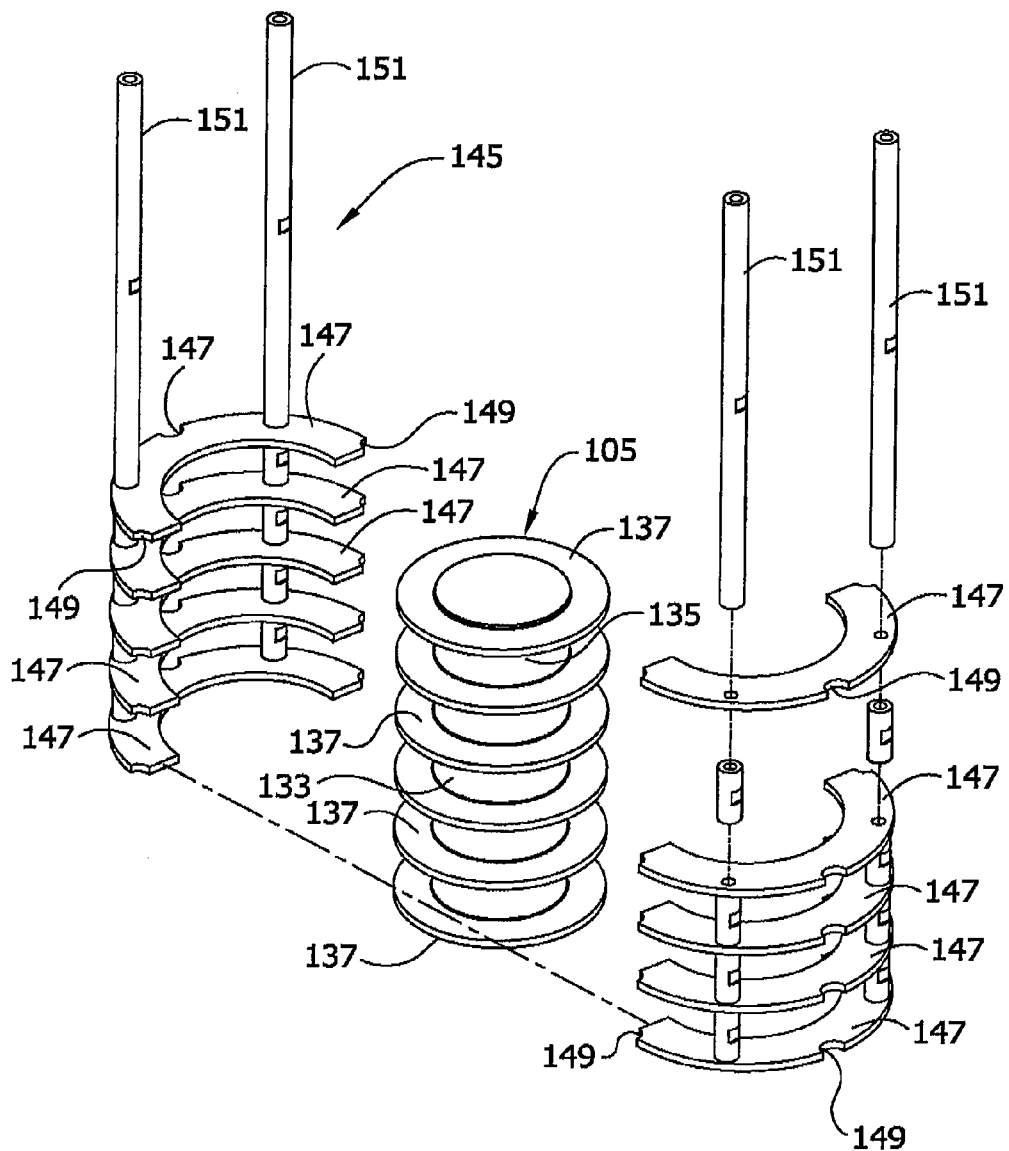
FIG. 4 is an exploded perspective of a horn assembly and a baffle assembly of the ultrasonic treatment chamber of FIG. 2.

For example, as best illustrated in FIG. 4, the baffle members 147 are suitably formed separate from the tube 55 and are mounted on support rod assemblies 151 (four such rod assemblies are used in the illustrated embodiment). The support rod assemblies 151 are sized in length to extend from the outlet end 27 of the chamber (and more suitably from the closure 63) down through each of the baffle members. The support rod assemblies 151 are secured (such as being threadably secured) to the closure 63 to generally secure the baffle assembly 145 in place within the interior space 53 of the chamber 21.

More particularly, each of the annular baffle members 147 of the illustrated embodiment is of two-piece construction (each piece being semi-annular) for ease of assembling the baffle assembly around the horn assembly 105. For example, one set of baffle member 147 pieces is mounted on a pair of the support rod assemblies 151 and a set of the corresponding baffle member pieces is mounted on the other pair of support rod assemblies so that when all of the support rod assemblies are in place within the interior space 53 of the chamber 21 the annular shape of each baffle member is formed.

In the illustrated embodiment, each support rod assembly 151 comprises a plurality of discrete rod segments, e.g., with a rod segment extending between and threadably connected to the baffle member 147 pieces. It is contemplated, though, that each rod assembly 151 may comprise a single rod and the baffle members 147 formed integrally with or formed separate from and connected to such a single rod. It is also understood that the baffle members 147 may be of single piece construction, or constructed from more than two pieces, without departing from the scope of this invention. It is further contemplated that the baffle members 147 may be suitably supported in the interior space 53 of the chamber 21 other than by the support rod assemblies 151 of the illustrated embodiment and remain within the scope of this invention. In other suitable embodiments, for example, the baffle members 147 may instead be formed integrally with the tube 55 of the chamber housing 51, or formed separate from the tube and secured to the inner surface 67 of the housing sidewall 57.

Also, while the baffle members 147 illustrated in FIGS. 3 and 4 are each generally flat, e.g., having a generally thin rectangular cross-section, it is contemplated that one or more of the baffle members may each be other than generally flat or rectangular in cross-section to further facilitate the flow of gas bubbles along the interior space 53 of the chamber 21. The term cross-section is used in this instance to refer to a cross-section taken along one transverse direction (e.g., radially in the illustrated embodiment) relative to the horn outer surface 135).

For example, FIG. 6 illustrates an alternative embodiment of a baffle assembly 345 comprised of a plurality of discrete, annular baffle members 347 in longitudinally spaced relationship with each other. Each of the baffle members 347 has opposite faces 353, 355 and has a non-uniform thickness, and in particular the thickness decreases as the baffle member extends inward away from the chamber sidewall 57. In the illustrated embodiment, the baffle members 347 are generally triangular in cross-section. More suitably, each baffle member 347 is constructed so that the lower face 353 of the baffle member extends other than solely in the transverse direction and in particular the lower face is angled relative to the chamber sidewall 57 to extend in part longitudinally toward the outlet end of the chamber 21. It is also contemplated that both the lower and the upper faces 353, 355 may be angled relative to the chamber sidewall 57 and extend in part longitudinally toward the outlet end of the chamber 21 without departing from the scope of this invention.

Figure 7:
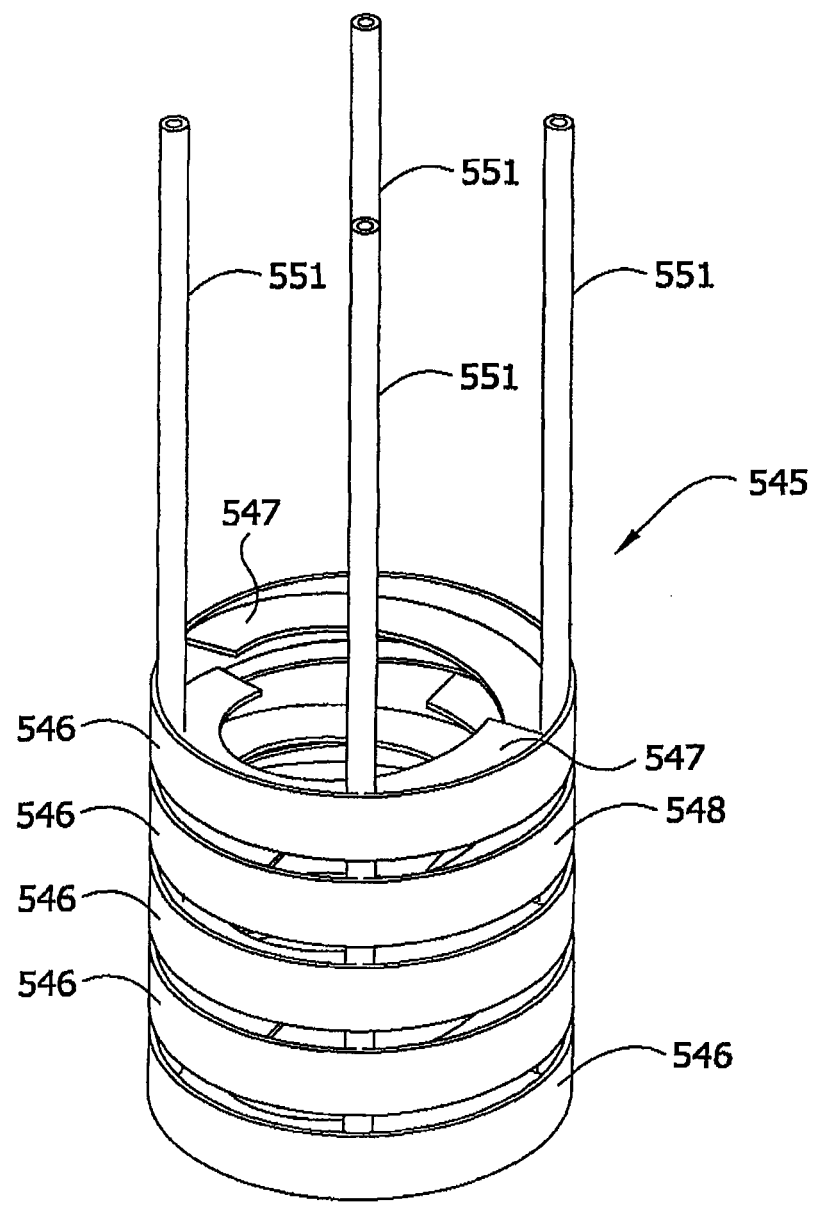
FIG. 7 is a front perspective of another alternative embodiment of a baffle assembly.
Figure 8:
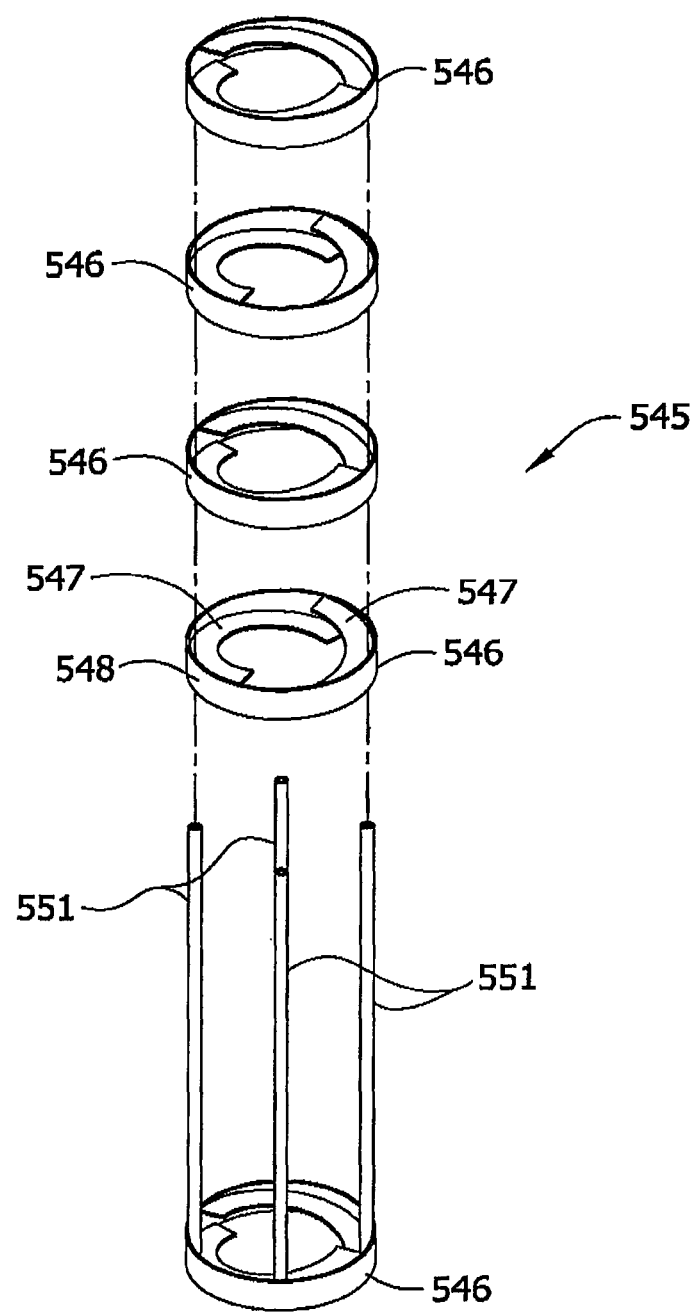
FIG. 8 is an exploded view thereof.
Figure 9:
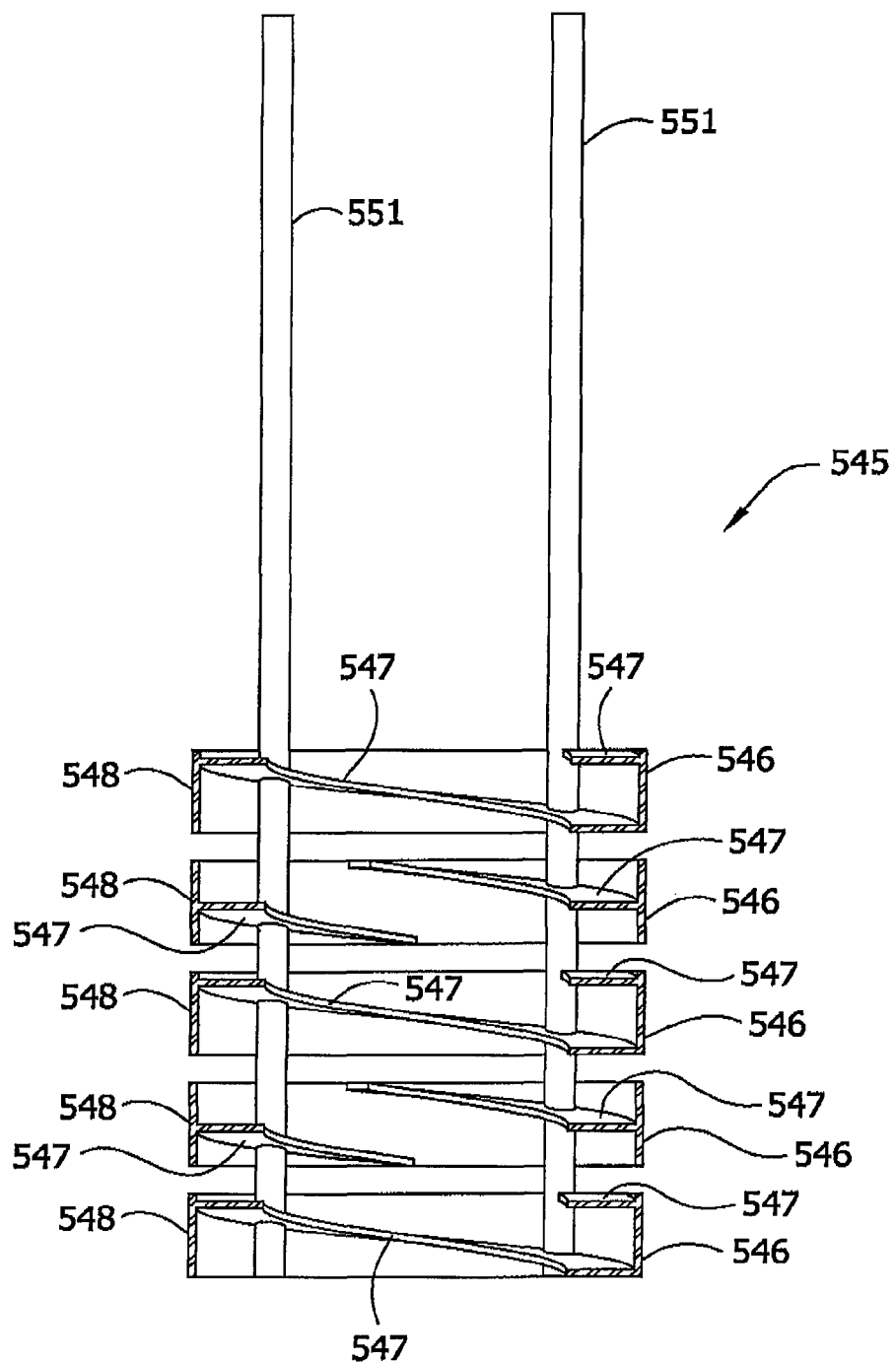
FIG. 9 is a longitudinal (e.g., vertical) cross-section thereof.

FIGS. 7-9 illustrate another alternative embodiment of a baffle assembly 545 useful in facilitating the flow of gas bubbles along the interior space of the chamber. In this embodiment, there are a plurality of discrete baffle segments 546, each having a longitudinal outer wall 548 for abutting against the chamber sidewall, and a pair of baffle members 547 in the form of arcuate segments that are secured to the outer wall to extend in part circumferentially about the horn (not shown but similar to the horn 133 of the embodiment of FIG. 3). As best seen in FIG. 9, the longitudinal position of each of the arcuate baffle members 547 gradually varies as the segment extends in a circumferential direction. The baffle segments 546 are each mounted on suitable support rod assemblies 551 as described previously.

In operation according to one embodiment of the ink solution mixing system 23 illustrated in FIG. 1, the one or more ink components 32 (with at least one of the components being a liquid) to be mixed together are delivered (e.g., by the pumps 31 in the illustrated embodiment) via the conduits 33 to the inlet ports 69a, 69b formed in the collar 61 of the treatment chamber housing 51. As these components enter the interior space 53 of the chamber 21 via the inlet ports 69a, 69b, the orientation of the inlet ports induces a relatively swirling action to initiate mixing of these components upstream of the horn assembly 105, such as in the fluid intake zone of the interior space of the chamber.

In accordance with one embodiment of a process for treating liquid such as the ink solution, as the liquid solution continues to flow upward within the chamber 21 the waveguide assembly 101, and more particularly the horn assembly 105, is driven by the drive system 131 to vibrate at a predetermined ultrasonic frequency. In response to ultrasonic excitation of the horn 133, the agitating members 137 that extend outward from the outer surface 135 of the horn 133 dynamically flex/bend relative to the horn, or displace transversely (depending on the longitudinal position of the agitating member relative to the nodal region of the horn). When using a horn assembly 205 such as that illustrated in FIG. 5 with one of the agitating members 237 disposed at the nodal region of the horn and having a longitudinal 241 component spaced transversely from the horn, the longitudinal component of the agitating member dynamically flexes/bends transversely relative to the horn.

Liquid solution continuously flows longitudinally along the flow path between the horn assembly 105 and the inner surface 67 of the housing sidewall 57 so that the ultrasonic vibration of the agitating members 137 induces mixing together of the various components being mixed. In particularly suitable embodiments, the dynamic motion of the agitating members causes cavitation in the liquid to further facilitate agitation, and in particular mixing in the system 23 of FIG. 1, of the liquid solution. The baffle members 147 disrupt the longitudinal flow of liquid along the inner surface 67 of the housing sidewall 57 and repeatedly direct the flow transversely inward to flow over the vibrating agitating members 137.

As the mixed liquid solution flows longitudinally downstream past the terminal end 103 of the waveguide assembly 101 toward the buffer zone, an initial back mixing of the liquid solution also occurs as a result of the dynamic motion of the agitating member 137 at or adjacent the terminal end of the horn 133. Further downstream flow of the liquid solution, e.g., within the buffer zone, results in the agitated solution providing a more uniform mixture of components prior to exiting the treatment chamber 21 via the outlet port 65 for subsequent post-processing by the post-processing system 35.

Figure 10:
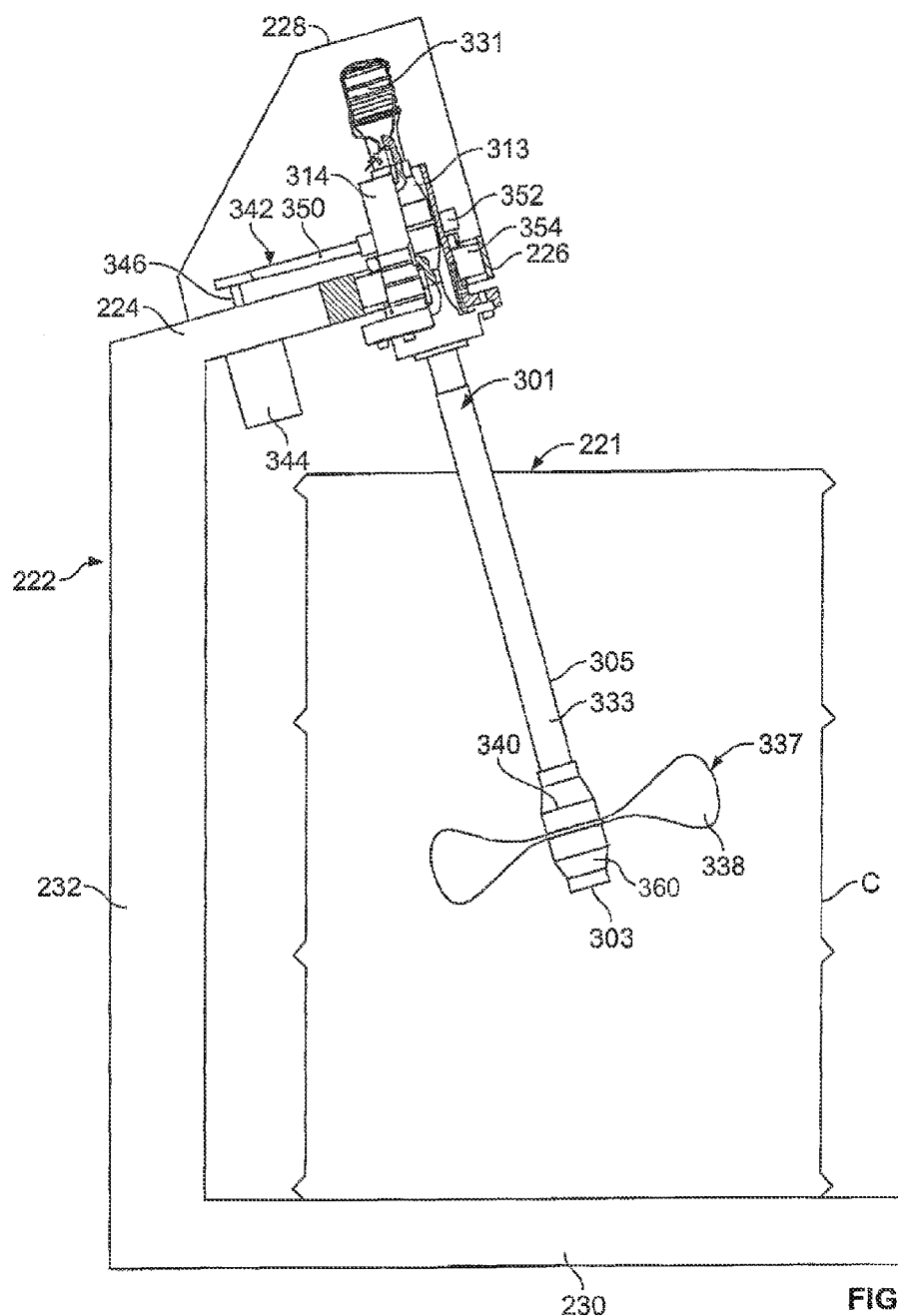
FIG. 10 is a side elevation of an ultrasonic treatment device with parts thereof being broken away to show internal components, the ultrasonic treatment device being supported by a support structure.

FIG. 10 illustrates one embodiment of a system, indicated generally at 220, for ultrasonically treating a substance. The term substance is used herein to refer to a liquid, solid, semisolid or gelatinous substance. The system of FIG. 10 comprises an ultrasonic treatment device, indicated generally at 221, supported by suitable support structure, indicated generally at 222, for particular use in a batch-type process in which a solid, semi-solid or gelatinous substance is contained within a container C and ultrasonically treated (e.g., in a batch-type treatment process) by the ultrasonic treatment device to render the substance more ready to flow. It is understood, however, that the ultrasonic treatment device of this embodiment may be used for mixing liquids or any of the other uses set forth above in connection with the previous embodiments.

Additionally, while the ultrasonic treatment device 221 is illustrated in FIG. 10 as being used with a generally open container C for treating a substance therein in a batch-type process, it is understood that this device may be used with the more closed, continuous flow process and treatment chamber of the previous embodiments without departing from the scope of this invention.

The illustrated support structure 222 generally comprises a base 230, an upright 232 extending up from the base, and a support arm 224 extending from the upright generally at the upper end thereof and having a mounting portion 226 at a distal end of the arm for mounting the ultrasonic treatment device 221 on the support structure. The support structure 222 also comprises a housing 228 for covering an upper extent of the ultrasonic treatment device 221 when the device is mounted on the support structure. The base 230 of the illustrated support structure 222 generally defines a platform on which the container C is located for treatment of the substance within the container. As an example, in the illustrated embodiment the container C is a drum, or barrel, and more particularly a 55-gallon drum. It is understood, however, that the container C may be sized smaller or larger than a 55-gallon drum, and may be other than drum or barrel-shaped without departing from the scope of this invention. It is also contemplated that the base 230 need not define a platform on which the container C is located, such that the container simply stands on the ground or other surface on which the support structure stands, or located on a platform (not shown) or other structure (not shown) that is separate from the support structure 222.

In one particularly suitable embodiment, the arm 224 is hinged or otherwise articulated to the upright 232 so that the arm and thereby the ultrasonic treatment device 221 can be pivoted or otherwise moved relative to the upright, base 230 and container C to position the device at a desired transverse location, depth (i.e., lowered into and raised out of) and angle within the container. In another suitable embodiment, the upright 230 may be adjustable in length (i.e., height in the illustrated embodiment) so that the support structure 222 can accommodate containers C of various heights. It is understood that the support structure 222 can have different configurations and modes of operation than that illustrated in FIG. 10 and described above without departing from the scope of this invention.

The ultrasonic treatment device 221 comprises an ultrasonic waveguide assembly, indicated generally at 301, operable at a predetermined ultrasonic frequency to ultrasonically energize the substance within the container C. The illustrated ultrasonic waveguide assembly 301 suitably comprises an elongate ultrasonic horn 305 having an outer surface 333 and a terminal end 303, and further having a longitudinal axis that in the embodiment of FIG. 10 defines a longitudinal axis of the entire waveguide assembly. The illustrated elongate horn 305 is sized to have a length equal to about six one-half wavelengths of the horn. It is understood, however, that the length of the horn can be greater than or less than about six one-half wavelengths without departing from the scope of this invention.

The horn 305 thus has multiple nodal regions located generally longitudinally along the horn. As used herein, a "nodal region" of the horn 305 refers to a longitudinal region or segment of the horn along which little (or no) longitudinal displacement occurs during ultrasonic vibration of the horn and transverse (e.g., radial in the illustrated embodiment) displacement of the horn is generally maximized. Transverse displacement of the horn 305 suitably comprises transverse expansion of the horn but may also include transverse movement (e.g., bending) of the horn. In the illustrated embodiment, the configuration of the ultrasonic horn 305 is such that the nodal regions are particularly defined by nodal planes (i.e., a plane transverse to the horn at which no longitudinal displacement occurs while transverse displacement is generally maximized) is present. This plane is also sometimes referred to as a nodal point. For the illustrated ultrasonic horn 305, the terminal end 303 of the horn 305 defines an antinodal region, and more particularly an anti-nodal plane or point of the horn at which longitudinal displacement is of the horn is generally maximized during ultrasonic vibration of the horn while transverse displacement is generally minimized. It is understood, however, that the horn 305 may be configured so that a nodal region or plane is disposed at the terminal end 303 of the horn 305 without departing from the scope of this invention.

The illustrated waveguide assembly 301 further comprises a booster 313 coaxially aligned with and connected to the ultrasonic horn 305 at an upper end of the horn. A suitable ultrasonic drive system 331 for ultrasonically driving the waveguide assembly 301 comprises at least an exciter (not shown) and a power source (not shown) operatively connected to the booster 313 (and more broadly to the waveguide assembly 301) to energize the waveguide assembly to mechanically vibrate the horn 305 at an ultrasonic frequency. Examples of suitable ultrasonic drive systems 331 include a Model 20A3000 system available from Dukane Ultrasonics of St. Charles, Ill., and a Model 2000CS system available from Herrmann Ultrasonics of Schaumberg, Ill. The booster 313 can be operatively connected to the exciter by employing any conventional technique or device. For example, electrical power can be directed with suitable electrical conductors to a conventional slip ring assembly 314, and the slip ring assembly can be employed to operatively direct the electrical power to the exciter. The exciter can use the electrical power to generate the desired ultrasonic energy, and direct the ultrasonic energy to the horn 305.

The ultrasonic treatment device 221 is suitably mounted on the distal end of the support arm to permit rotation of the ultrasonic horn 305 about its longitudinal axis, and more particularly in the illustrated embodiment to permit rotation of the entire waveguide assembly 301 about the longitudinal axis of the horn. As an example, in the embodiment of FIG. 10 the waveguide assembly 301 is mounted on the support arm 224 at least in part by a suitable bearing 354 so that the entire waveguide assembly is rotatable relative to the support structure 222 and the container C about the longitudinal axis of the ultrasonic horn.

A suitable drive system, generally indicated at 342, is also mounted on the support structure 222 (e.g., in the illustrated embodiment it is mounted on the support arm 224) is driving connection with the waveguide assembly 221 for driving rotation of the waveguide assembly, and hence the ultrasonic horn 305. The illustrated drive system 342 comprises a drive motor 344, a first pulley 346 rotatably driven by the motor, a second pulley 352 connected to the waveguide assembly 221 and a drive belt 350 operatively connecting the second pulley to the first pulley. Accordingly, operation of the motor 344 to rotate the first pulley drives rotation of the waveguide assembly 221 via the belt 352 and second pulley 352. It is understood that alternative drive systems for rotating the ultrasonic horn may be used without departing from the scope of this invention. In one particularly suitable embodiment, the drive system 342 is controllable to vary the rotational speed of the waveguide assembly 301. That is, the rotational speed of the ultrasonic horn 305 can be selectively sped up or slowed down.

With reference still to FIG. 10, the ultrasonic waveguide assembly 301 further comprises at least one agitating member, generally indicated at 337, supported by and more suitably mounted on the horn 305 for conjoint rotation with the horn about its longitudinal axis and extending at least in part transversely outward from the outer surface of the horn. In the illustrated embodiment, the agitating member 337 suitably comprises a propeller having a hub 340 and a plurality of blades 338 (two blades being shown on the propeller of FIG. 10) extending out from the hub. Each of the blades 338 is suitably twisted or canted along a portion of its length to facilitate movement of the substance by the blades upon rotation of the blades within the substance. It is understood that the propeller can have any number of blades and that the blades can have a configuration different that that illustrated in FIG. 10 without departing from the scope of this invention.

The agitating member 337 of the illustrated embodiment is suitably mounted on the horn 305 at a nodal region or plane of the horn to minimize the exposure of the agitating member to longitudinal vibration of the horn. More suitably, the agitating member 337 is mounted on the horn 305 at least in part by a suitable isolating member 360 that isolates the agitating member 337 from the transverse displacement of the horn during ultrasonic vibration thereof. In this manner, exposure of the agitating member 337 to both the longitudinal and transverse displacement of the horn 305 during ultrasonic vibration is reduced. As an example, the isolating member 360 of the illustrated embodiment comprises a suitable resilient sleeve that surrounds the ultrasonic horn generally at the nodal region at which the agitating member 337 is located. The hub 340 of the agitating member fits over the resilient sleeve and clamps the sleeve between the hub and the outer surface of the ultrasonic horn 305.

It is understood, though, that in other embodiments the agitating member 337 may be located longitudinally on the horn 305 other than at a nodal region of the horn. In such an embodiment, suitable isolating structure may be used to isolate the agitating member 337 from longitudinal vibration of the horn. In other such embodiments, the agitating member 337 may be mounted on the horn 305 without being vibrationally isolated therefrom so that the blades 338 of the agitating member are ultrasonically excited along with the horn, such as in the same manner as the rings described in previous embodiments, while the blades are being rotated.

In the illustrated embodiment of FIG. 10, the agitating member 337 is suitably located at the nodal region nearest the terminal end 303 of the ultrasonic horn 305 so that the agitating member will be disposed as deep as possible into the substance within the container C when the ultrasonic treatment device 221 is positioned within the container. It is understood, however, that the agitating member 337 may be located other than near the terminal end 303 of the horn 305, such as substantially anywhere along the horn including at the terminal end thereof, without departing from the scope of this invention. It is also contemplated that more than one agitating member 337 may be mounted on the horn 305 for rotation therewith.

Figure 11:
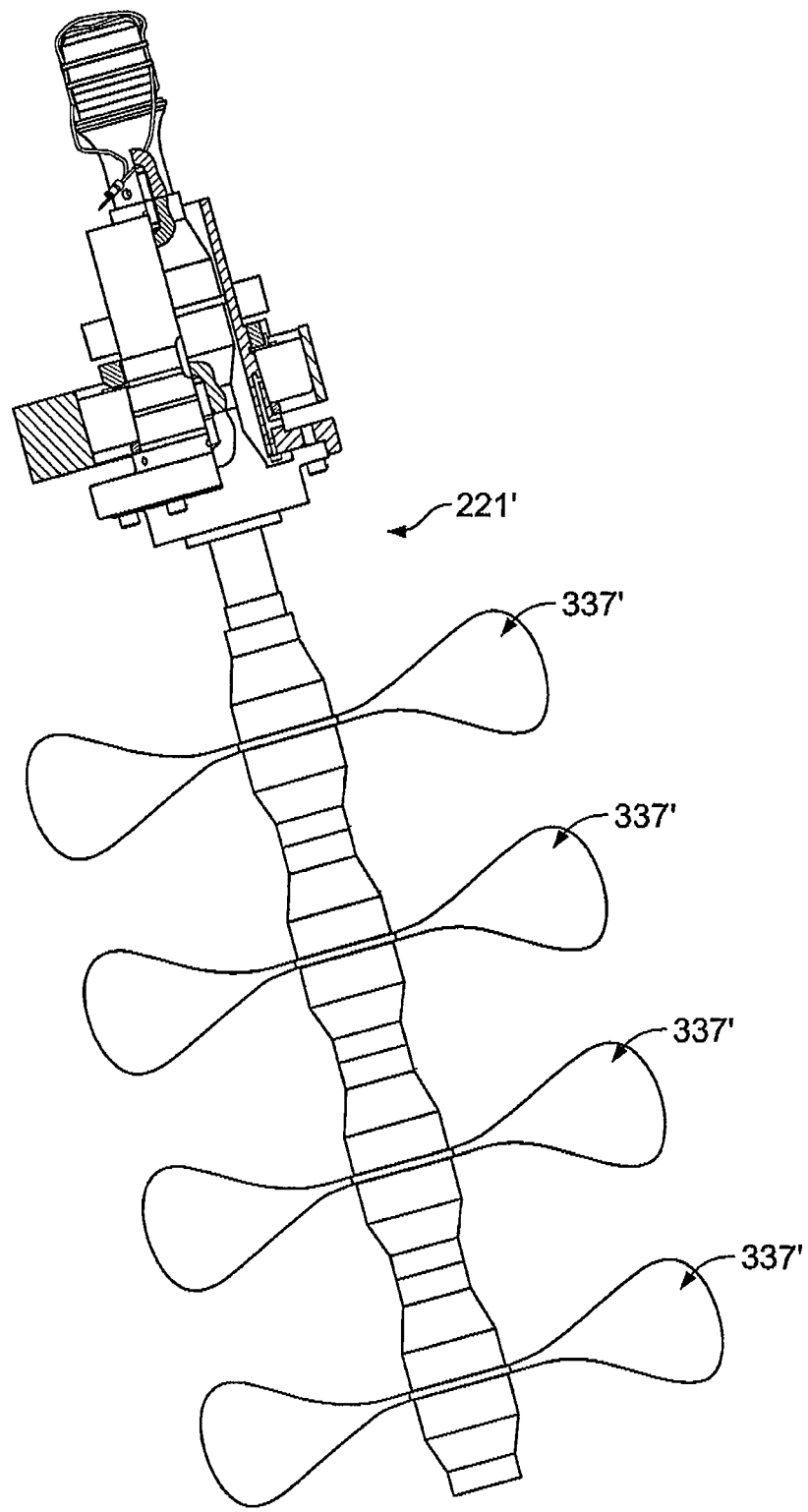
FIG. 11 is a side elevation of an ultrasonic treatment device having another embodiment.

For example, FIG. 11 illustrates an embodiment of a system 221' in which the ultrasonic treatment device 221' has four agitating members 337' mounted on the horn in longitudinal, coaxial relationship with each other. The longitudinal spacing between agitating members 337' may be other than as illustrated in FIG. 11 (e.g., either closer or spaced further apart). While the agitating members 337' illustrated in FIG. 11 are equally spaced along the horn 305, it is alternatively contemplated that where more than two mixing members are present the spacing between longitudinally consecutive agitating members need not be uniform to remain within the scope of this invention.

While in the illustrated embodiment of FIG. 11 the agitating members 337 are each propellers, it is understood that at least one of the agitating members may be configured different from of one the other agitating members. For example, one or more of the agitating members 337 may comprise one of the rings used as agitating members in the prior embodiments. Also, in the illustrated embodiments of FIGS. 10 and 11 the agitating members 337 (the propellers) are mounted on the horn for conjoint rotation with the horn. However, in other embodiments it is contemplated that the horn may be stationary while the agitating members are mounted on the horn for rotation relative to the horn about the longitudinal axis of the horn. In such an embodiment, the drive system 342 would be operatively connected to the agitating member(s) 337 instead of the entire waveguide assembly.

In operation according to one embodiment of a process for treating a substance, the container C containing the substance to be treated is placed on the base 230 of the support structure 222, or otherwise beneath the ultrasonic treatment device 221, with the top of the container open. The waveguide assembly 221 is lowered so that at least the portion of the ultrasonic horn 305 on which the agitating member 337 (or members) is submerged in the substance to be treated. The ultrasonic horn 305 is ultrasonically driven (via the exciter and booster) to ultrasonically excite the horn to thereby ultrasonically energize the substance within the container C. Concurrently, the drive system 342 is operated to rotate the horn 305, and hence the blades 338 of the agitating member 337, to further agitate or mix the substance while it is ultrasonically energized. The waveguide assembly 301 may be moved around within the substance, such as by changing the angle of the assembly relative to the container, by raising and lowering the assembly within the container and/or moving the assembly transversely within the container, to facilitate a more thorough agitation through the substance. As one particular example, where the substance is a solid, semi-solid or gelatinous substance, such as lard or wax, ultrasonically energizing the substance using the ultrasonic horn while concurrently rotating the agitating member within the substance substantially increases the rate at which the substance is rendered more readily flowable for further processing of the substance.

When introducing elements of the present invention or preferred embodiments thereof, the articles "a", "an", "the", and "said" are intended to mean that there are one or more of the elements. The terms "comprising", "including", and "having" are intended to be inclusive.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An ultrasonic treatment system for ultrasonically treating a substance, said ultrasonic treatment system comprising an elongate ultrasonic horn positionable within the substance and excitable to vibrate ultrasonically to energize the substance, said horn having a longitudinal axis and an outer surface for contact with the substance, said system further comprising an agitating member disposed on the ultrasonic horn and rotatable about the longitudinal axis of the horn during ultrasonic vibration of said horn to agitate the substance, the agitating member being mounted on the ultrasonic horn by an isolating member to at least in part vibrationally isolate the agitation member from the ultrasonic horn.

2. The ultrasonic treatment system set forth in claim 1 wherein said system comprises support structure for supporting the ultrasonic horn within the substance, the horn being rotatable relative to the support structure about the longitudinal axis of the horn, the agitating member being mounted on the horn for conjoint rotation with the horn about the longitudinal axis of said horn.

3. The ultrasonic treatment system set forth in claim 1 wherein the isolating member isolates the agitating member from at least one of longitudinal displacement and transverse displacement of the horn.

4. The ultrasonic treatment system set forth in claim 1 wherein the agitating member comprises a hub surrounding the outer surface of the horn, the isolating member comprising a sleeve constructed of a resilient material, said sleeve being disposed between the hub and the outer surface of the horn.

5. The ultrasonic treatment system set forth in claim 1 wherein the ultrasonic horn has at least one nodal region, the agitating member being disposed on the horn generally at said nodal region.

6. The ultrasonic treatment system set forth in claim 1 wherein the agitating member comprises a propeller having a plurality of blades arranged to extend transversely outward relative to the outer surface of the horn.

7. The ultrasonic treatment system set forth in claim 6 wherein each of the plurality of blades is twisted along a portion of its length.

8. The ultrasonic treatment system set forth in claim 2 further comprising a drive system for driving rotation of the ultrasonic horn, said drive system comprising a motor, a first pulley driven by the motor, a second pulley operatively connected to the horn, and a belt drivingly connecting the first and second pulleys.

9. The ultrasonic treatment system set forth in claim 8 wherein the drive system is a variable speed drive system.

10. The ultrasonic treatment system set forth in claim 1 wherein the ultrasonic horn has a terminal end, the agitating member being disposed on the horn generally adjacent the terminal end of the horn.

11. The ultrasonic treatment system set forth in claim 1 wherein the ultrasonic horn has a length greater than one wavelength.

12. The ultrasonic treatment system set forth in claim 1 wherein the system comprises a plurality of agitating members disposed on said horn in longitudinal relationship with each other, at least one the agitating members being rotatable about the longitudinal axis of the horn.

13. The ultrasonic treatment system set forth in claim 12 wherein each of the agitating members is rotatable about the longitudinal axis of the horn.

14. The ultrasonic treatment system set forth in claim 12 wherein the ultrasonic horn has a plurality of nodal regions, each of the agitating members being disposed on the horn at a respective one of the nodal regions.

15. An ultrasonic treatment system for ultrasonically treating a substance, said ultrasonic treatment system comprising an elongate ultrasonic horn positionable within the substance and excitable to vibrate ultrasonically to energize the substance, said horn having a longitudinal axis and an outer surface for contact with the substance, said system further comprising an agitating member disposed on the ultrasonic horn and rotatable about the longitudinal axis of the horn during ultrasonic vibration of said horn to agitate the substance, the agitating member being mounted on the ultrasonic horn at least in part by an isolating member to isolate the agitating member from mechanical vibration of the horn.

16. The ultrasonic treatment system set forth in claim 15 wherein the agitating member comprises a hub surrounding the outer surface of the horn, the isolating member comprising a sleeve constructed of a resilient material, said sleeve being disposed between the hub and the outer surface of the horn.

17. The ultrasonic treatment system set forth in claim 15 wherein the ultrasonic horn has at least one nodal region, the agitating member being disposed on the horn generally at said nodal region.

18. The ultrasonic treatment system set forth in claim 15 wherein the agitating member comprises a propeller having a plurality of blades arranged to extend transversely outward relative to the outer surface of the horn.

19. The ultrasonic treatment system set forth in claim 15 further comprising a drive system for driving rotation of the ultrasonic horn.

20. An ultrasonic treatment system for ultrasonically treating a substance, said ultrasonic treatment system comprising an elongate ultrasonic horn positionable within the substance and excitable to vibrate ultrasonically to energize the substance, said horn having a longitudinal axis and an outer surface for contact with the substance, said system further comprising a plurality of agitating members disposed on the ultrasonic horn in longitudinal relationship with each other, at least one of the agitating members being rotatable about the longitudinal axis of the horn during ultrasonic vibration of said horn to agitate the substance, the at least one of the agitating members being mounted on the ultrasonic horn by an isolating member to at least in part isolate the agitating member from mechanical vibration of the horn.

\* \* \* \* \*